US009325235B2

(12) United States Patent
Pahlevaninezhad et al.

(10) Patent No.: US 9,325,235 B2
(45) Date of Patent: Apr. 26, 2016

(54) ADAPTIVE NONLINEAR CURRENT OBSERVER FOR BOOST PFC AC/DC CONVERTERS

(71) Applicants: Majid Pahlevaninezhad, Kingston (CA); Praveen Jain, Kingston (CA)

(72) Inventors: Majid Pahlevaninezhad, Kingston (CA); Praveen Jain, Kingston (CA)

(73) Assignee: CISTEL TECHNOLOGY INC., Ottawa, Ontario (CA)

( * ) Notice: Subject to any disclaimer, the term of this patent is extended or adjusted under 35 U.S.C. 154(b) by 120 days.

(21) Appl. No.: 14/215,849

(22) Filed: Mar. 17, 2014

(65) Prior Publication Data

US 2015/0263603 A1 Sep. 17, 2015

(51) Int. Cl.
*H02M 3/335* (2006.01)
*H02M 1/42* (2007.01)
*H02M 3/158* (2006.01)
*H02M 1/00* (2007.01)

(52) U.S. Cl.
CPC .......... *H02M 1/4208* (2013.01); *H02M 1/4225* (2013.01); *H02M 3/335* (2013.01); *H02M 3/33507* (2013.01); *H02M 2001/0009* (2013.01); *H02M 2003/1586* (2013.01); *Y02B 70/126* (2013.01)

(58) Field of Classification Search
CPC .................................................... H02M 3/335
USPC ...................................................... 363/16, 17
See application file for complete search history.

(56) References Cited

U.S. PATENT DOCUMENTS

2008/0246444 A1* 10/2008 Shao ................... H02M 1/4225
323/207
2010/0327765 A1* 12/2010 Melanson ........... H02M 3/3374
315/291

OTHER PUBLICATIONS

Emadi, A et al., "Power Electronics and Motor Drives in Electric, Hybrid Electric, and Plug-In Hybrid Electric Vehicles", Industrial Electronics, IEEE Transactions on , vol. 55, No. 6, pp. 2237-2245, Jun. 2008.
Nussbaumer, T. et al., "Design Guidelines for Interleaved Single-Phase Boost PFC Circuits", Industrial Electronics, IEEE Transactions on , vol. 56, No. 7, pp. 2559-2573, Jul. 2009.
Nussbaumer, T. et al., "Comparison of 3-Phase Wide Output Voltage Range PWM Rectifiers", Industrial Electronics, IEEE Transactions on , vol. 54, No. 6, pp. 3422-3425, Dec. 2007.
Giral, R. et al., "Interleaved converters operation based on CMC", Power Electronics, IEEE Transactions on , vol. 14, No. 4, pp. 643-652, Jul. 1999.
Pahlevannezhad, M., et al., "A ZVS Interleaved Boost AC/DC Converter Used in Plug-in Electric Vehicles", Power Electronics, IEEE Transactions on , vol. 27, No. 8, pp. 3513-3529, Aug. 2012.

(Continued)

*Primary Examiner* — Jue Zhang
*Assistant Examiner* — Trinh Dang
(74) *Attorney, Agent, or Firm* — Brion Raffoul

(57) ABSTRACT

Systems, methods, and devices which estimate the inductor current in a power factor correction (PFC) converter for use with AC/DC converters. A control system for use with the PFC takes as input the input voltage and the output voltage of the PFC. Control signals for power semiconductor subcircuits in the PFC are then output from the control system. The control system uses an adaptive observer sub-circuit that estimates the inductor current and the bus voltage. The adaptive observer uses an adaptive updater which uses both the estimates and the estimate error to update the adaptive observer's estimates.

19 Claims, 32 Drawing Sheets

(56) References Cited

OTHER PUBLICATIONS

Koasai, H. et al., "Coupled Inductor Characterization for a High Performance Interleaved Boost Converter", Magnetics, IEEE Transactions on, vol. 45, No. 10, pp. 4812-4815, Oct. 2009.
Gallo, C.A., "A Passive Lossless Snubber Applied to the ACDC Interleaved Boost Converter", Power Electronics, IEEE Transactions on, vol. 25, No. 3, pp. 775-785, Mar. 2010.
Balestero, J.P.R. et al., "Power Factor Correction Boost Converter Based on the Three-State Switching Cell", Industrial Electronics, IEEE Transactions on, vol. 59, No. 3, pp. 1565,1577, Mar. 2012.
Das, P. et al., "Analysis and Design of a New AC-DC Single-Stage Full-Bridge PWM Converter With Two Controllers", Industrial Electronics, IEEE Transactions on, vol. 60, No. 11, pp. 4930,4946, Nov. 2013.
Lee, J.Y., "6.6kW On-Board Charger Design Using DCM PFC Converter with Harmonic Modulation Technique and Two-Stage DC/DC Converter", Industrial Electronics, IEEE Transactions on, vol. PP, No. 99, pp. 1,1, 2013.
Kim, H.S., et al., "On/Off Control of Boost PFC Converters to Improve Light Load Efficiency in Paralleled Power Supply Units for Servers", Industrial Electronics, IEEE Transactions on, vol. PP, No. 99, pp. 1,1, 2013.
Athab, H.S. et al., "An Efficient Single-Switch Quasi-Active PFC Converter with Continuous Input Current and Low DC-Bus Voltage Stress", Industrial Electronics, IEEE Transactions on, vol. PP, No. 99, pp. 1,1, 2013.
Karaarslan, A., "The Implementation of Bee Colony Optimization Algorithm to SheppardTaylor PFC Converter", Industrial Electronics, IEEE Transactions on, vol. 60, No. 9, pp. 3711,3719, Sep. 2013.
Pahlevaninezhad, M. et al., "A Novel ZVZCS Full-Bridge DC/DC Converter Used for Electric Vehicles", Power Electronics, IEEE Transactions on, vol. 27, No. 6, pp. 2752-2769, Jun. 2012.
Kovacevic, I. et al., "3D Electromagnetic Modeling of EMI Input Filters", Industrial Electronics, IEEE Transactions on, vol. PP, No. 99, pp. 1,1, 2013.
Prudenzi, A. et al., "IEC Std. 61000-3-2 harmonic current emission limits in practical systems: need of considering loading level and attenuation effects", Power Engineering Society Summer Meeting, 2001, vol. 1, No., pp. 277-282 vol. 1, 2001.
O Laughlin, Michael, UCC28070 300-W Interleaved PFC Pre-Regulator Design Review, Unitrode Application Note SLUA-479B.
Makki, A. et al., "Using hall-effect sensors to add digital recording capability to electromechanical relays", Protective Relay Engineers, 2010 63rd Annual Conference for, vol., No., pp. 1,12, Mar. 29, 2010-Apr. 1, 2010.
Pankau, J. et al. "High frequency modeling of current sensors", Applied Power Electronics Conference and Exposition, 1999. APEC '99. Fourteenth Annual, vol. 2, No., pp. 788,794 vol. 2, Mar. 14-18, 1999.
Honeywell, "Hall Effect Sensing and Application", Application Note, 005715-2-EN IL50 GLO 1198.
Todd, Philip C., "Extend Curent Transforner Range", Unitrode Application DN-41.
Qiu, D.Y. et al., "On the use of current sensors for the control of power converters", Power Electronics, IEEE Transactions on, vol. 18, No. 4, pp. 1047-1055, Jul. 2003.
O Laughlin, Michael, 350-W, Two-Phase Interleaved PFC Pre-Regulator Design Review, TI Application Report SLUA369B, Feb. 2005.
Chen, Hung-Chi, "Single-Loop Current Sensorless Control for Single-Phase Boost-Type SMR", Power Electronics, IEEE Transactions on, vol. 24, No. 1, pp. 163-171, Jan. 2009.
Chen, Hung-Chi et al., "Modified Single-Loop Current Sensorless Control for Single-Phase Boost-Type SMR With Distorted Input Voltage", Power Electronics, IEEE Transactions on, vol. 26, No. 5, pp. 1322-1328, May 2011.
Chen, Hung-Chi et al., "Modeling and Small-Signal Analysis of a Switch-Mode Rectifier With Single-Loop Current Sensorless Control", Power Electronics, IEEE Transactions on, vol. 25, No. 1, pp. 75-84, Jan. 2010.
Ohnishi, T et al., "DC voltage sensorless single-phase PFC converter", Power Electronics, IEEE Transactions on, vol. 19, No. 2, pp. 404-410, Mar. 2004.
Lopez-Martin, V.M., et al., "Current error compensation for current-sensorless power factor corrector stage in continuous conduction mode", Control and Modeling for Power Electronics (COMPEL), 2012 IEEE 13th Workshop on, vol., No., pp. 1,8, Jun. 10-13, 2012.
Walcott, B.L. et al., "Comparative study of non-linear state-observation techniques", International Journal of Control, May 2007.
EN61000-6-4 Electromagnetic compatibility (EMC)—Pat 6-4: Generic standards—Emission standard for industrial environments (IEC 61000-6-4:2006).
Altera Corporation, Cyclone IV Device Handbook, CYIV-53001-1. 5, vol. 3, Nov. 2011.

* cited by examiner

ADAPTIVE NONLINEAR CURRENT OBSERVER FOR BOOST PFC AC/DC CONVERTERS

TECHNICAL FIELD

The present invention relates to power converters. More specifically, the present invention relates to circuits, methods, and systems for estimating an inductor current in a power factor correction converter.

BACKGROUND OF THE INVENTION

AC/DC single-phase power conversion systems are widely used in industry to convert available electrical energy from the utility mains to a DC output voltage. In various industrial applications such as telecom, network server power supplies, plug-in and hybrid electric vehicles, etc., AC/DC converters are extensively employed to provide an isolated DC voltage from 12V to 600V. For applications in the range of few kilo-watts, AC/DC power conversion systems generally consist of a single phase front-end power factor correction (PFC) converter followed by an isolated full-bridge pulse width modulator (PWM) converter as shown in FIG. 1. The front-end converter must comply with the stringent regulatory standards on the input current harmonics imposed by different agencies. Boost converters are generally used to implement the PFC for the AC/DC converters. In order to effectively minimize the high frequency ripple of the converter input current and output capacitor, multiple boost converters are typically interleaved especially for higher power applications.

FIG. 2 shows the conventional control system of the AC/DC PFC boost converter according to the prior art. In this conventional control system, there is an external voltage loop to regulate the DC-bus voltage and an internal current loop to shape the input current of the converter. There are fundamental challenges in both external voltage loop and internal current loop of the conventional control system. In order to implement the internal current loop, precise information of the boost inductor current is required. There are three different techniques to measure the inductor current. Since the inductor current is low frequency, a Hall effect sensor can be used to measure the inductor current. However, Hall effect sensors suffer from several practical difficulties. Due to the remnant flux, these sensors introduce a time varying DC-bias into the control system. Therefore, a correction algorithm has to be added to compensate for the time varying DC bias. This algorithm increases the complexity of the implementation of the control system. As well, the bandwidth of the Hall effect sensors are limited and they introduce delay into the closed-loop control system. This delay may jeopardise the stability of the control system. Finally, Hall effect sensors are very costly and can significantly contribute to the overall cost of the converter.

The second technique to measure the inductor current is through resistive current sensors. Resistive current sensors require a very precise and noise-free differential amplifier. Also, they increase the power losses of the converter. These power losses are not preferable, especially in higher power applications. These resistive current sensors are also very costly in applications where a very precise current value is required.

The most common method used in industry for determining the inductor current is that of using a Current Transformer (CT) to sense the inductor current. Since the inductor current is low frequency, the CT is usually placed in series with the boost power semiconductor in order to sample the inductor current when the switch is ON. FIG. 3 shows the schematic of the PFC boost converter with CT in series with the power semiconductor. This sensing technique is an affordable solution and is widely used in industrial products. However, the current measurement using a CT creates some major difficulties for the converter. Placing a CT in series with the boost power semiconductor increases the inductive path and causes high voltage spikes across the power semiconductors during the switching transitions. Also, CTs restrict the maximum duty cycle of the converter. This is because the magnetizing inductance of CTs needs to be reset in each switching cycle. Therefore, a suitable amount of time is required to guarantee the reliable performance of CTs. This issue is very pronounced at the zero crossings of the input voltage where the converter should operate with a very high duty ratio.

Another issue related to the use of CTs for sensing current occurs when multiple boost converters are interleaved to share the current and to effectively reduce the input current ripple in higher power applications. FIG. 4 shows a two phase interleaved boost converter. According to FIG. 4, in order to eliminate the switching noise and measure the average inductor current in one switching cycle, the Analogue-to-Digital Converter (ADC) should sample the current at the midpoint of the duty ratio (as shown in FIG. 4). However, due to the phase-shift between the boost phases, the switching noise of one phase may affect the sampling of the next phase. This highly degrades the reliability of the control system. Because of this, in practical circuits a low-pass filter is often used to attenuate the switching noise. Nevertheless, the low-pass filter introduces delay to the control loop and deteriorates the stability margins. Considering all the fundamental issues regarding the current sensors in boost PFC converter, current sensorless techniques are very advantageous in this particular application. Such a sensorless approach can provide a clean and noise-free estimation of the inductor current. As well, it can also provide a very cost-effective solution for this application.

Previous attempts have been made to implement a sensorless current estimators. In one attempt, a single-loop current sensorless control approach was used for a boost PFC converter. For this attempt, a single voltage loop was used to control the converter. While this attempt seems to provide a very simple solution for boost PFC converter, it is very sensitive to the converter parameters. In particular, at light loads the performance of the converter significantly degrades especially close to the current zero crossings.

In another attempt, a modified version of the single-loop current sensorless control technique was proposed. This attempt was able to offer better performance in terms of Total Harmonic Distortion (THD) and zero crossing distortion.

Another sensorless technique was also proposed which was able to determine the duty ratio of the boost PFC converter based on the input AC voltage. The idea behind this proposal was to calculate the output voltage using the input voltage from a voltage sensor and from the voltage drop across the inductor derived based on the converter circuit. Then, the duty ratio is determined using the input and output voltage. However, this approach is only useful for applications where the load variations are very limited and where a high quality input current is not required.

A further attempt has been able to compensate for the error caused by parasitic components. This further attempt demonstrated high quality input current for heavy loads but the current quality deteriorates at light loads.

Considering all the issues related to the current measurement for the boost inductor, eliminating the current sensor is very advantageous for various applications. Eliminating the current sensor can not only improve the performance of the control system but also reduce the overall cost of the converter significantly. However, the particular topology of the boost PFC converter makes the design of the observer very challenging. The topology of the boost converter results in a highly nonlinear mathematical model for the converter. Therefore, a nonlinear observer is required to estimate the inductor current. Also, in many applications, the load information is not available for the observer to be used in the observer structure. Thus, the load value is an unknown parameter for the observer. The other difficulty related to this particular topology is that the converter loses its observability at certain operating conditions.

There is therefore a need for systems, methods, and devices which mitigate if not overcome the shortcomings of the prior art. As well, it would be preferred for any solutions to address the issue of the non-observability of the converter under certain conditions.

SUMMARY OF INVENTION

The present invention provides systems, methods, and devices which estimate the inductor current in a power factor correction (PFC) converter for use with AC/DC converters. A control system for use with the PFC takes as input the input voltage and the output voltage of the PFC. Control signals for power semiconductor subcircuits in the PFC are then output from the control system. The control system uses an adaptive observer sub-circuit that estimates the inductor current and the bus voltage. The adaptive observer uses an adaptive updater which uses both the estimates and the output voltage estimate error to update the adaptive observer's estimates.

In a first aspect, the present invention provides a power factor correction boost converter with a current transformer, the converter comprising:
- a diode bridge coupled between a first coupling node and a second coupling node;
- an inductor coupled between said first coupling node and a third coupling node;
- a power semiconductor subcircuit coupled between said third coupling node and said second coupling node;
- an output diode coupled between said third coupling node and a positive output node;
- a control subsystem for controlling said first and second power semiconductor subcircuits, said control subsystem having as input an output voltage of said converter, and an input voltage of said converter, said output voltage being between said positive output node and said second coupling node, said input voltage being between said first coupling node and said second coupling node, said control system comprising:
- an adaptive observer subcircuit for estimating an inductor current and said output voltage.

In a second aspect, the present invention provides a power factor correction boost converter with a current transformer, the converter comprising:
- a diode bridge coupled between a first coupling node and a second coupling node;
- a first inductor coupled between said first coupling node and a third coupling node;
- a first power semiconductor subcircuit coupled between said third coupling node and said second coupling node;
- a first output diode coupled between said third coupling node and a positive output node;
- a second inductor coupled between said first coupling node and a fourth coupling node;

- a second output diode coupled between said fourth coupling node and said positive output node;
- a second power semiconductor subcircuit coupled between said second coupling node and said fourth coupling node;
- a control subsystem for controlling said first and second power semiconductor subcircuits, said control subsystem having as input an output voltage of said converter, and an input voltage of said converter, said output voltage being between said positive output node and said second coupling node, said input voltage being between said first coupling node and said second coupling node, said control system comprising:
- an adaptive observer subcircuit for estimating an inductor current and said output voltage.

In a third aspect, the present invention provides an adaptive nonlinear observer circuit for estimating an inductor current and an output voltage of a power factor correction (PFC) boost converter, the observer circuit comprising:
- plurality of summing blocks;
- a plurality of multiplication blocks;
- a plurality of coefficient blocks;
- wherein said blocks implement:

$$\dot{\hat{x}}_1 = \frac{1}{L}v_{in} - \frac{1}{L}u\hat{x}_2 + \left(\frac{1}{C_{BUS}} - \frac{1}{L}\right)(x_2 - \hat{x}_2)u,$$

$$\dot{\hat{x}}_2 = \frac{1}{C_{BUS}}u\hat{x}_1 - \hat{\theta}\hat{x}_2 + \vartheta(x_2 - \hat{x}_2),$$

and $$\dot{\hat{\theta}} = -\mu\tilde{x}_2\hat{x}_2$$

where
$\hat{x}_1$ is an updated estimate for an inductor current of said converter;
$\hat{x}_2$ is an updated estimate for an output voltage between a positive output node and a negative output node of said converter;
$x_2$ is the output voltage of said converter;
$\hat{x}_2$ is an estimate for said output voltage;
$\hat{x}_1$ is an estimate for said inductor current of said converter;
u is a value related to a duty ratio of said input;
L is an inductance of said converter;
$C_{BUS}$ is an output capacitance of said converter; and
$v_{in}$ is the input voltage between said first coupling point and said second coupling point
$\tilde{x}_2$ is an estimated error of $x_2$;
$\hat{\theta}$ is an estimated value based on $\hat{x}_2$ and $\tilde{x}_2$;
$R_L$ is a load resistance;
$\hat{\theta}$ is an updated estimate for a value for $$\frac{1}{C_{BUS}R_L};$$

θ is a positive real coefficient; and
μ is a positive constant value.

In a fourth aspect, the present invention provides a method for estimating an inductor current and an output voltage for a power factor correction boost converter, the method comprising:
a) determining an input voltage for said converter;
b) determining an output voltage for said converter;
c) determining an output capacitance for said converter;

d) determining an inductance for said converter;
e) continuously estimating said output voltage based on a previous reading of said output voltage;
f) continuously estimating said inductor current based on estimates of said output voltage;
wherein steps e) and f) are executed using:

$$\dot{\hat{x}}_1 = \frac{1}{L}v_{in} - \frac{1}{L}u\hat{x}_2 + \left(\frac{1}{C_{BUS}} - \frac{1}{L}\right)(x_2 - \hat{x}_2)u;$$

$$\dot{\hat{x}}_2 = \frac{1}{C_{BUS}}u\hat{x}_1 - \hat{\theta}\hat{x}_2 + \vartheta(x_2 - \hat{x}_2);$$

and $$\dot{\hat{\theta}} = -\mu\tilde{x}_2\hat{x}_2$$

where $\hat{x}_1$ is an updated estimate for said inductor current of said converter;
$\hat{x}_2$ is an updated estimate for said PFC output voltage, said output voltage being between a positive output node and a negative output node of said converter;
$x_2$ is said output voltage;
$\hat{x}_2$ is an estimate for said PFC output voltage;
$\hat{x}_1$ is an estimate for said inductor current of said converter;
u is a value related to a duty ratio of said input;
L is an inductance of said converter;
$C_{BUS}$ is an output capacitance of said converter;
$v_{in}$ is the input voltage between said first coupling point and said second coupling point;
$\tilde{x}_2$ is an estimated error of $x_2$;
$\hat{\theta}$ is an estimated value based on $\hat{x}_2$ and $\tilde{x}_2$
$R_L$ is a load resistance;
$\hat{\theta}$ is an updated estimate for a value for $$\frac{1}{C_{BUS}R_L};$$

θ is a positive real coefficient; and
μ is a positive constant value.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
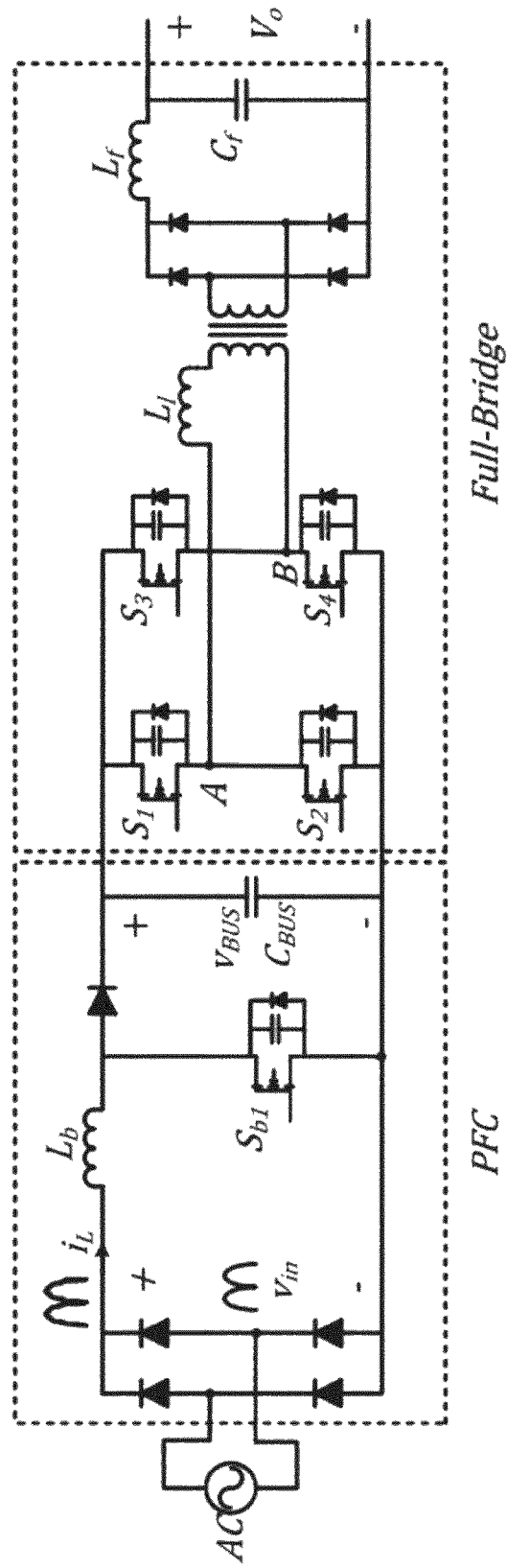
FIG. 1 illustrates an isolated full-bridge PWM converter.
Figure 2:
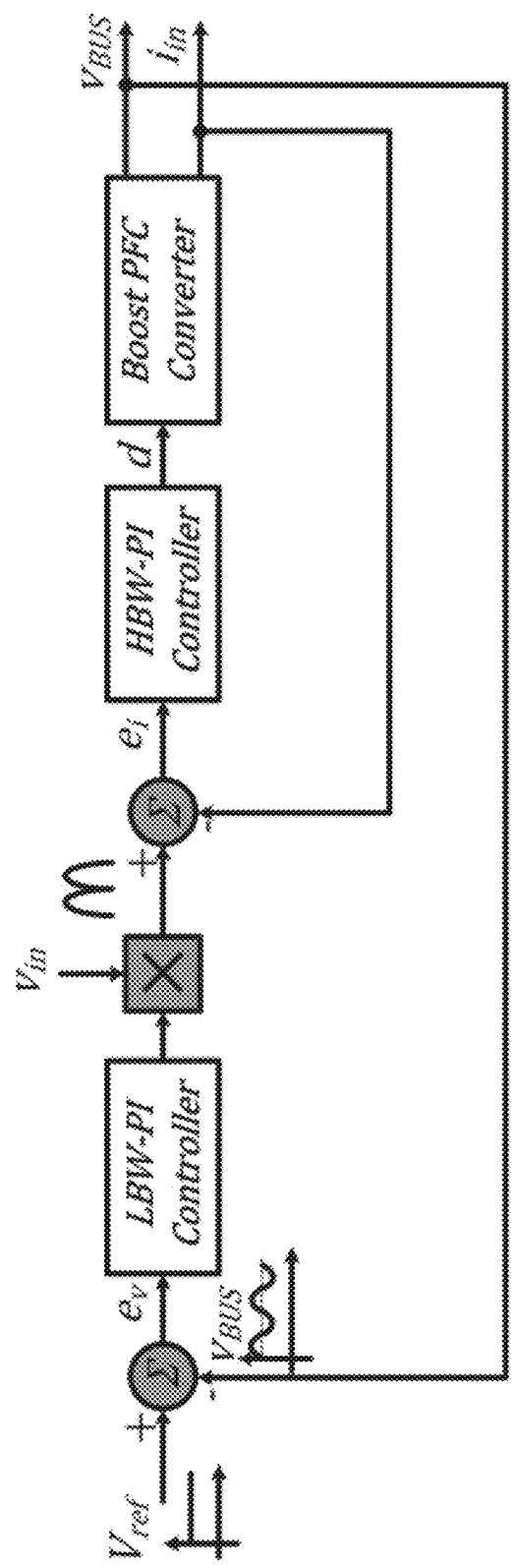
FIG. 2 shows—a conventional control system for an AC/DC PFC boost converter.
Figure 3:
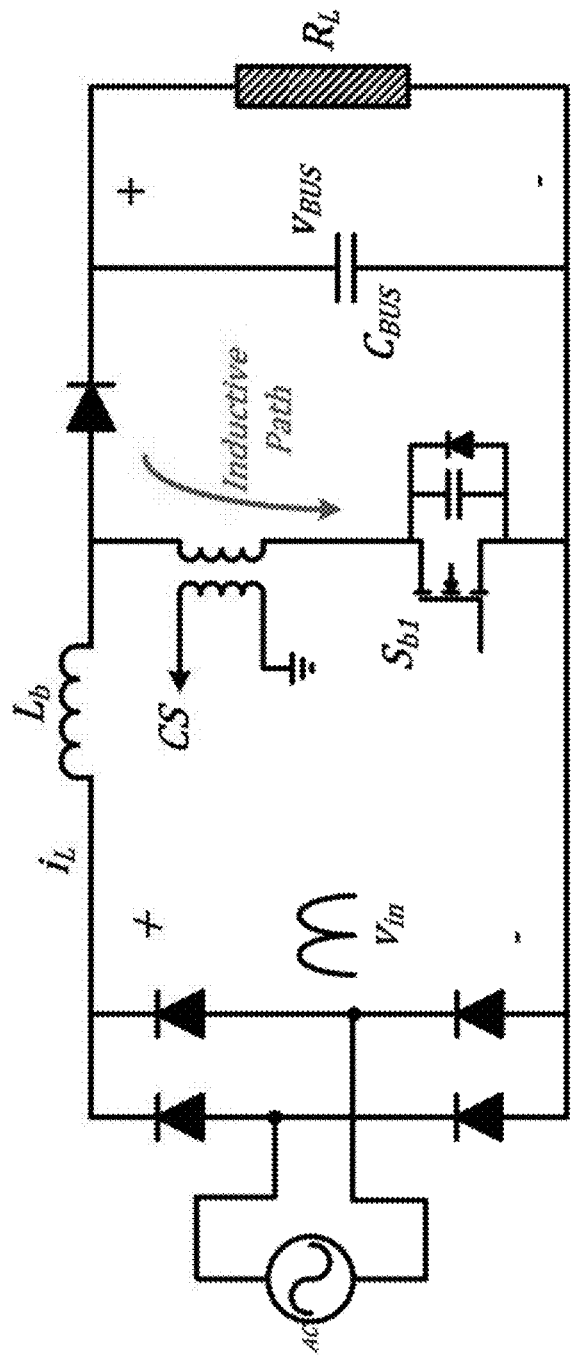
FIG. 3 is schematic of a PFC boost converter with a current transformer in series with the power semiconductors.
Figure 4:
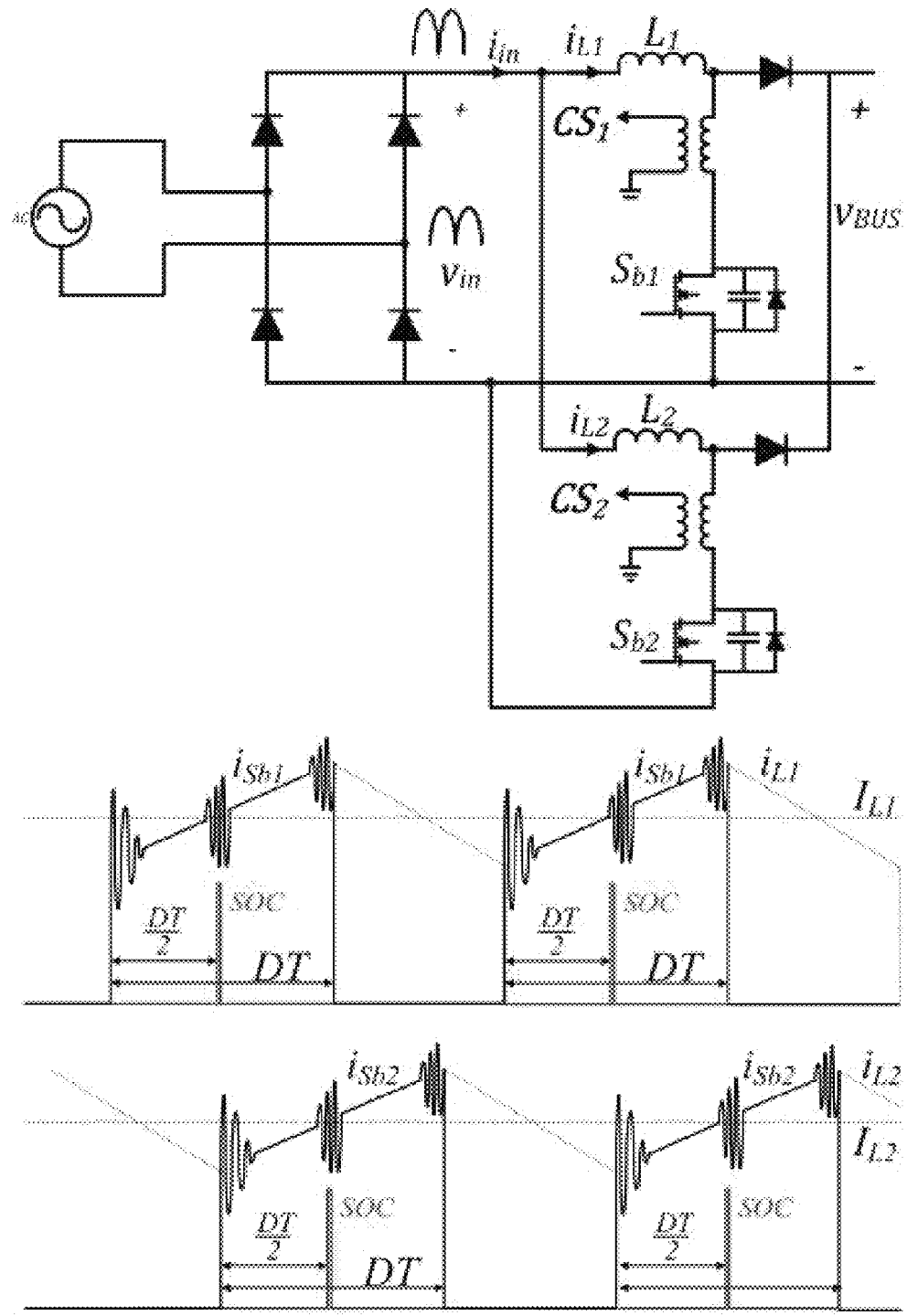
FIG. 4 illustrates a two phase interleaved boost converter.

This description is organized as follows: A mathematical modelling of the AC/DC converter is presented in Section I. In Section II, an adaptive nonlinear current observer according to one aspect of the invention is explained. The stability of this nonlinear observer for boost PFC converters is then discussed in Section III. In Section IV, a qualitative analysis of the closed-loop control system from geometric point of view is presented. In Section V, the performance of the sensorless control system is verified through simulation. Experimental results from an industrial prototype of the control system are then given in section VI. It should be noted that the section headings are only provided for the reader's convenience and are not meant to form part of the disclosure.

As will be shown below, it can be mathematically proven that the boost PFC converter is not observable at zero crossings of the input voltage. Because of this, the observer can not provide proper information for those points and some other methods should be used to circumvent the non-observable operating conditions. The adaptive nonlinear observer according to one aspect of the invention estimates the boost inductor current. The adaptive observer adaptively estimates the load value and, because of this, the adaptive observer does not require the load information. Also, the adaptive observer incorporates an algorithm that addresses the non-observable operating points. The adaptive observer offers a very reliable and cost-effective solution for various applications such as telecommunications, plug-in electric vehicles, aerospace, etc.

Power factor correction (PFC) is an essential part of AC/DC converters used to improve the quality of the current drawn from the utility grid. The PFC closed-loop control system requires a precise measurement of the boost inductor current in order to tightly shape the input current. As noted above, current sensors are widely used in the PFC closed-loop control system to measure the boost inductor current. Current sensors introduce delay, and noise to the control circuitry. Also, they significantly contribute to the overall cost of the converter. Therefore, they make the implementation of the PFC converter complicated and costly. Current sensorless control techniques can offer a cost-effective solution for various applications. The unique structure of the boost PFC converter makes it challenging to robustly estimate the inductor current due to the nonlinear structure of the converter. Also, because the system loses observability at some singular operating points, this makes the observer design more challenging. In addition, the load value is unknown in most applications. Thus, the observer should be able to estimate the inductor current even while there are uncertainties in the load and other parameters. The adaptive nonlinear observer for boost PFC according to one aspect of the invention is able to accurately estimate the inductor current. The adaptive structure of the converter allows robust and reliable performance of the observer in presence of parameter uncertainties, particularly load variations. Also, auxiliary compensation is integrated into the observer to circumvent the singular operating points and to provide a precise estimation for the entire range of operation. Simulations and experimental results from a 3 kW AC/DC converter are presented below to verify the feasibility of this sensorless control approach and to demonstrate the superior performance.

Section I: Mathematical Modeling

In this section the mathematical model of the boost PFC converter is derived. Generally, in power converters the average model over one switching cycle is able to precisely predict the behaviour of the converter since the eigenvalues of the converter are much slower than the switching frequency. This is usually the case for most power converters where the resonance frequency of the passive components are much smaller than the switching frequency. According to the schematic of the boost PFC converter, the averaged dynamics over one switching cycle is given by:

$$\frac{di_L}{dt} = \frac{1}{L} v_{in} - \frac{1}{L}(1-d) v_{BUS} \qquad (1)$$

$$\frac{dv_{BUS}}{dt} = \frac{1}{C_{BUS}}(1-d) i_L - \frac{1}{C_{BUS} R_L} v_{BUS} \qquad (2)$$

Due to the coupling between the control input, d, and the state variables, the dynamics represent a nonlinear system. This nonlinear dynamics can be given in the standard form as follows:

$$\dot{X} = f(X) + g(X)u + w \qquad (3)$$

where $$X = \begin{bmatrix} x_1 \\ x_2 \end{bmatrix} = \begin{bmatrix} i_L \\ v_{BUS} \end{bmatrix}$$

$$f(X) = \begin{bmatrix} 0 \\ -\frac{1}{C_{BUS} R_L} x_2 \end{bmatrix},$$

$$g(X) = \begin{bmatrix} \frac{1}{L} x_2 \\ \frac{1}{C_{BUS}} x_1 \end{bmatrix}$$

$$w = \begin{bmatrix} \frac{v_{in}}{L} \\ 0 \end{bmatrix},$$

$$u = 1 - d$$

Equation (3) represents a control affine system. (The system is control affine because it formulates a linear combination of vector fields f and g on smooth manifold $\mathfrak{R}^2$). Since the dynamics of the systems is nonlinear, the design of an observer for this system is very challenging. Also, the operating conditions can vary in a very wide range due to the variations of the input voltage and of the input current from zero to maximum during each half cycle. Thus, linearising the model cannot provide a very precise approach. Another difficulty regarding the design of the observer is that the load value $R_L$ in Eqn. (2) is not known and it can vary across a wide range of values. In the next section, first the observability of the system will be analysed in detail and then the adaptive nonlinear observer will be presented.

Section II: Nonlinear Observer for Boost PFC Converter

In order to develop a current sensorless control law, first the observability of the state variable representing the inductor currents in the state space model (see Eqn. (3)) has to be examined. The large signal mathematical model of the boost PFC converter, given by Eqn. (3), represents an affine nonlinear system owing to the coupling of the input duty ratio d with the state variables. Moreover, the wide operating conditions of a boost PFC AC/DC converter fed by a sinusoidal input AC voltage makes the observability of the state representing the inductor current all the more interesting and challenging. In linear systems, the observability is independent of the control input. This property is because the relationship between the initial state and the measured output is linear. However, nonlinear systems often exhibit some singular inputs, which can make the system unobservable. Herein lies one of the subtleties regarding the observability of nonlinear systems. In particular, it will be shown below that the PFC boost dynamics loses observability at certain duty ratios.

In order to analyse the observability, it is assumed that the observer dynamics are much faster than the controller dynamics. This is a common practice in designing the observers. Considering the only state that can be measured is $v_{BUS}$ the dynamics can be rewritten as:

$$\Sigma_{Boost}: \begin{cases} \dot{X} = f(X, u) \\ y = h = x_2 \end{cases} \quad (4)$$

where, $$f(X, u) = \begin{bmatrix} f_1 \\ f_2 \end{bmatrix} = \begin{bmatrix} \frac{1}{L}v_{in} - \frac{1}{L}ux_2 \\ \frac{1}{C_{BUS}}ux_1 - \frac{1}{C_{BUS}R_L}x_2 \end{bmatrix}$$

The observability of the nonlinear system is examined by using the Lie derivative of the measurable output. In particular, the rank of the following matrix determines the observability of the nonlinear system:

$$\Theta = \begin{bmatrix} \nabla h \\ \nabla L_f h \end{bmatrix} = \begin{bmatrix} 0 & 1 \\ \frac{1}{C_{BUS}}u & -\frac{1}{C_{BUS}R_L} \end{bmatrix} \quad (5)$$

According to Eqn. (5), the system is locally observable everywhere except when u=0. This operating condition corresponds to the zero crossings of the input voltage where the duty ratio is very close to one. Therefore the observability matrix, $\Theta$, is not full-rank at zero crossings of the input voltage. Since the converter passes through the zero crossings every half cycle for any operating conditions, a regular observer cannot be used to estimate the inductor current. A particular structure should be used to rectify this problem. In summary the following are the challenges related to the observer design for this particular converter:

Nonlinear Dynamics of the Converter,
Unknown Load Value $R_L$,
Non-Observable at the Input Voltage Zero Crossings.

The issues noted above can be addressed by the adaptive nonlinear observer described below. The observer dynamics is designed using the converter mathematical model as well as nonlinear correction terms given by:

$$\dot{\hat{x}}_1 = \frac{1}{L}v_{in} - \frac{1}{L}u\hat{x}_2 + \xi_1(h, u)(x_2 - \hat{x}_2) \quad (6)$$

$$\dot{\hat{x}}_2 = \frac{1}{C_{BUS}}u\hat{x}_1 - \hat{\theta}\hat{x}_2 + \xi_2(h, u)(x_2 - \hat{x}_2) \quad (7)$$

Eq. (6) is the same as Eqn. (1) except for the nonlinear correction term $\xi_1(h,u)(x_2-\hat{x}_2)$. Eqn. (2) includes $R_L$, and this load value can change and vary across a very wide range of values. Because of this, Eqn. (7) includes the estimation of the coefficient $1/(C_{BUS}R_L)$. The estimation is denoted by $\hat{\theta}$ and is given by:

$$\hat{\theta} = \frac{1}{C_{BUS}\hat{R}_L} \quad (8)$$

The estimation errors of the proposed observer are defined as:

$$\tilde{x}_1 = x_1 - \hat{x}_1 \quad (9)$$

$$\tilde{x}_2 = x_2 - \hat{x}_2 \quad (10)$$

According to Eqns. (4), (6), and (7), the error dynamics are given by:

$$\dot{\tilde{x}}_1 = -\frac{1}{L}u\tilde{x}_2 - \xi_1(h, u)\tilde{x}_2 \quad (11)$$

$$\dot{\tilde{x}}_2 = \frac{1}{C_{BUS}}u\tilde{x}_1 - \theta\tilde{x}_2 - \tilde{\theta}\hat{x}_2 - \xi_1(h, u)\tilde{x}_2 \quad (12)$$

where $\tilde{\theta}=\theta-\hat{\theta}$ and $\theta=1/(C_{BUS}R_L)$. The error dynamics represented by Eqns. (11) and (12) must be asymptotically stable in order to guarantee the fast convergence of the estimation error to zero. The following Lyapunov function is defined based on the estimation errors:

$$V = \frac{1}{2}\tilde{x}_1^2 + \frac{1}{2}\tilde{x}_2^2 + \frac{1}{2\mu}\tilde{\theta}^2 \quad (13)$$

The derivative of the Lyapunov function is given by:

$$\dot{V} = \tilde{x}_1\dot{\tilde{x}}_1 + \tilde{x}_2\dot{\tilde{x}}_2 + \frac{1}{\mu}\tilde{\theta}\dot{\tilde{\theta}} \quad (14)$$

Using Eqns. (11) and (12), the derivative of the Lyapunov function is derived as:

$$\dot{V} = \left[\frac{1}{C_{BUS}}u - \frac{1}{L}u - \xi_1(h, u)\right]\tilde{x}_1\tilde{x}_2 - \theta\tilde{x}_2^2 - \xi_2(h, u)\tilde{x}_2^2 + \tilde{\theta}\left(\frac{1}{\mu}\dot{\tilde{\theta}} - \tilde{x}_2\hat{x}_2\right) \quad (15)$$

Based on the derivative of the Lyapunov function, the observer coefficient and the adaptive law to estimate the coefficient $\theta$ are designed as follows:

$$\xi_1(u) = \left(\frac{1}{C_{BUS}} - \frac{1}{L}\right)u \quad (16)$$

$$\xi_2 = \theta \quad (17)$$

$$\dot{\hat{\theta}} = \mu\tilde{x}_2\hat{x}_2 \quad (18)$$

Thus, the proposed nonlinear adaptive observer is given by:

$$\dot{\hat{x}}_1 = \frac{1}{L}v_{in} - \frac{1}{L}u\hat{x}_2 + \left(\frac{1}{C_{BUS}} - \frac{1}{L}\right)(x_2 - \hat{x}_2)u \quad (19)$$

$$\dot{\hat{x}}_2 = \frac{1}{C_{BUS}}u\hat{x}_1 - \hat{\theta}\hat{x}_2 + \vartheta(x_2 - \hat{x}_2) \quad (20)$$

$$\dot{\hat{\theta}} = \mu\tilde{x}_2\hat{x}_2 \quad (21)$$

For clarity, it should be noted that $x_1$ represents $i_L$ and that $x_2$ represents $v_{BUS}$ while $\hat{x}_2$ is an estimate of $x_2$ and $\tilde{x}_2$ is an estimated error of $x_2$. In Eqns. (19)-(21), $\mu$ is an arbitrary positive real value which determines the speed of convergence for the update law. As well, $\theta$ is a positive real coefficient which determines the speed of convergence for the output voltage estimated error $\tilde{x}T_2$.

The observer described by Eqns. (19)-(21) is able to accurately estimate the inductor current independent of the load conditions. The nonlinear structure of the adaptive observer offers the flexibility to provide a globally asymptotic stable observer. The stability of this adaptive observer will be analysed below.

Figure 5:
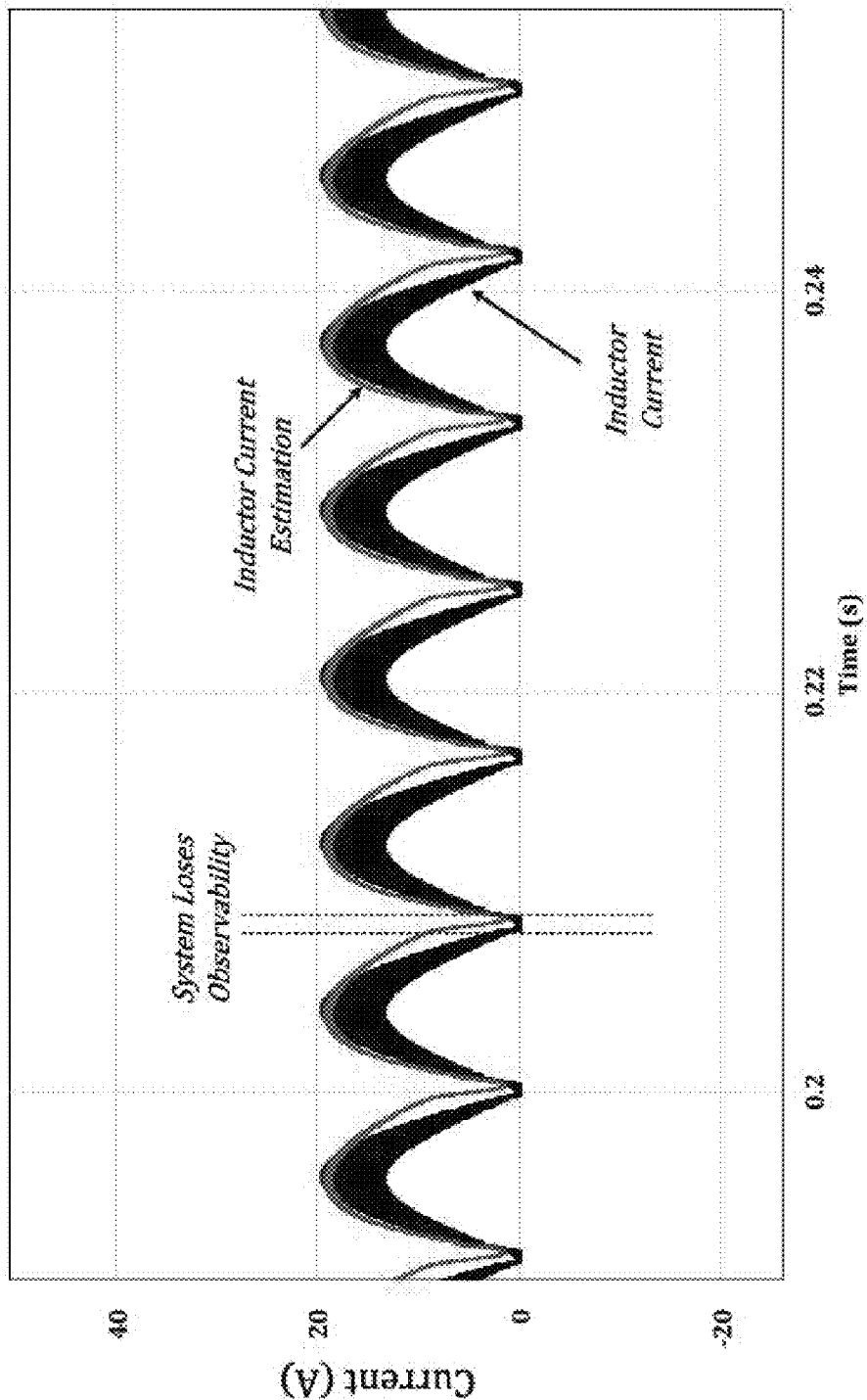
FIG. 5 illustrates that the system loses observability when the system trajectory approaches very high duty ratios.

As already mentioned, the gradient observability matrix loses the rank by one when u=1. This condition corresponds to unity duty ratio of the boost PFC converter (zero crossings of the input voltage). Since the system trajectory passes through this point every half cycle, the initial value of the inductor current is lost at the start of the line cycle. This may lead to a steady-state error in the observer estimation error. FIG. 5 shows a typical performance of the observer. According to this figure, the system loses its observability when the system trajectory approaches very high duty ratios. This causes the steady-state estimation error. The adaptive load estimation and the correction term try to compensate for the error in the inductor current initial value produced each half cycle. However, it can not completely compensate for this error.

Figure 6:
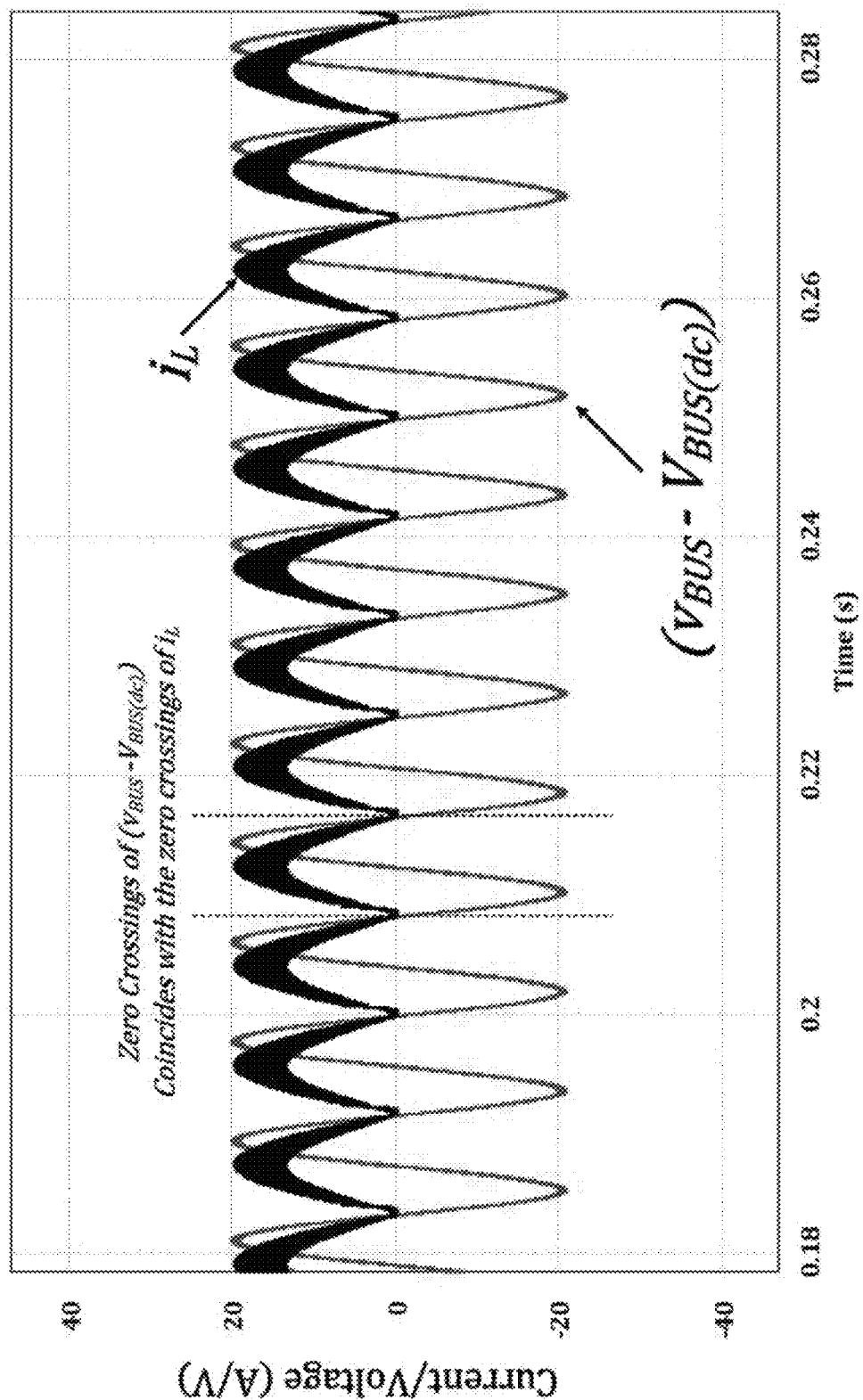
FIG. 6 show waveforms which show that the inductor current information can be derived from low frequency AC ripple of the output capacitor voltage.

Losing observability, or the observability matrix not being full-rank, means that there is not enough information to estimate the inductor current. Therefore, the current information at the zero crossing points should be estimated using some other state variable. In an AC/DC Boost PFC Converter, at the zero crossings of the input voltage waveform the input current must be zero. This condition coincides with the operating point where the output capacitor voltage is exactly the same as its DC value (since the capacitor voltage includes a pure DC value and a double frequency ripple). This structural feature can be used to estimate the inductor current at the point that system loses its observability. Therefore, the extra information required to estimate the inductor current at these zero crossing points is derived from the corresponding operating condition of the output capacitor voltage. FIG. 6 shows the inductor current and the AC waveform of capacitor voltage $v_{BUS} - V_{BUS(dc)}$. This figure shows that the inductor current information can be derived from the low frequency AC ripple of the output capacitor voltage. This concept is used to circumvent the difficulty regarding losing observability at certain operating points.

Figure 7:
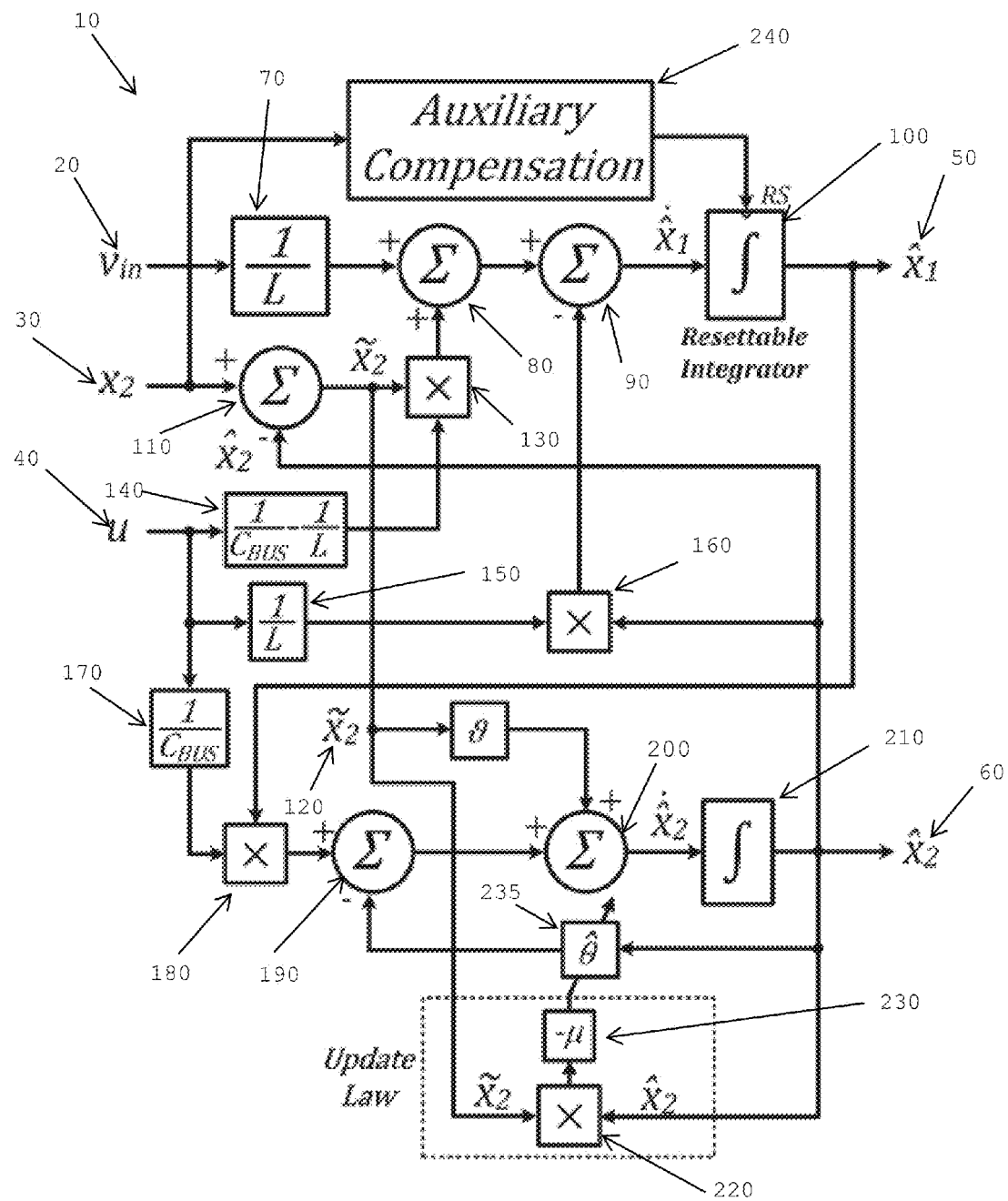
FIG. 7 is a block diagram of an adaptive nonlinear observer according to one aspect of the invention.

The block diagram of the adaptive nonlinear observer is shown in FIG. 7. In this figure, the nonlinear observer is structured based on Eqns. (19)-(20) and the update law is based on Eqn. (21). The auxiliary compensation block is added to reset the integrator of the inductor current estimation when the output capacitor voltage is equal to its DC value, or equivalently when the low frequency AC component of the output voltage passes through zero with negative slope (these points correspond to the operating conditions where the observability is lost). The auxiliary compensation uses the output capacitor information to estimate the inductor currents at those points.

Again referring to FIG. 7, the adaptive nonlinear observer subcircuit 10 according to one aspect of the invention is illustrated. The inputs to the subcircuit 10 are the input voltage 20 to the PFC converter, the output voltage 30 of the PFC converter, and a value u 40 which is related to the input duty ratio d. The outputs of the observer subcircuit 10 are estimates of the inductor current 50 ($\hat{x}_1$) and of the output voltage 60 ($\hat{x}_2$) of the converter. The input voltage 20 is received by a block 70 that multiplies the input voltage 20 by 1/L. The result of this block 70 is received by a summing block 80. The result of summing block 80 is received by another summing block 90. The result of summing block 90 is sent to a resettable integrator 100 and the result of the resettable integrator 100 is the estimate of the inductor current 50.

The output voltage 30 from the PFC converter is received by a summing block 110. This summing block 110 produces the estimate error 120 ($\tilde{x}_2$) for the PFC converter output voltage. This estimate error 120 is sent to a multiplier block 130 and the output of the multiplier block 130 is received by summing block 80. It should be noted that the summing block 110 subtracts the estimated output voltage 60 from the detected output voltage 30 to arrive at the estimate error 120.

The third input, the value u 40 is received by a block 140 that multiplies the value u 40 by $$\frac{1}{C_{BUS}} - \frac{1}{L}.$$

The output of this block 140 is sent to multiplier block 130. The value u 40 is also multiplied by block 150 by $$\frac{1}{L}.$$

The output of block 150 is then sent to a multiplier block 160 to be multiplied by estimated output voltage 60 ($\hat{x}_2$). The output of this multiplier block 160 is then subtracted by summing block 90.

The third input, the value u 40 is also received by a block 170 that multiplies the value u 40 by $$\frac{1}{C_{BUS}}.$$

The result of block 170 is then sent to multiplier block 180 which multiplies this result with estimated inductor current 50 ($\hat{x}_1$). The result of multiplier block 180 is then added by summing block 190. The result of summing block 190 is then received by summing block 200. The output of summing block 200 is then sent to the integrator 210. The output of integrator 210 is the estimated output voltage 60 ($\hat{x}_2$).

It should be noted that the estimate error 120 ($\tilde{x}_2$) for the PFC converter output voltage is used with the estimated output voltage 60 ($\hat{x}_2$) to update the estimated output voltage 60 ($\hat{x}_2$). The estimate error 120 ($\tilde{x}_2$) is sent to the summing block 200 to be added to the result of summing block 190. This summing block 190 subtracts from the result of multiplier block 180 the estimate for a specific coefficient $$\hat{\theta} = \frac{1}{C_{BUS}\hat{R}_L}.$$

This coefficient is calculated according to Eqn (21) such that the multiplier block 220 receives and multiplies the estimated output voltage 60 ($\hat{x}_2$) with the estimate error 120 ($\tilde{x}_2$). The result of the multiplier block 220 is then multiplied by the value $-\mu$ by way of block 230. The result of block 230 is the coefficient $\hat{\theta}$. This coefficient is multiplied by block 235 with the estimated output voltage 60 ($\hat{x}_2$) and, as noted above, the result of this block 235 is subtracted from the result of multiplier block 180.

As can be seen in FIG. 7, an auxiliary compensation block 240 forms part of the subcircuit 10. This block 240 receives as input the received output voltage $x_2$ from the converter. Based on this input, the block 240 resets the integrator 100 when the output capacitor voltage is equal to its DC value or when the low frequency AC component of the output voltage 30 passes through zero with negative slope. These points correspond to the operating conditions where the observability is lost. This block 240 uses the output capacitor information to estimate the inductor currents at those points.

Figure 8:
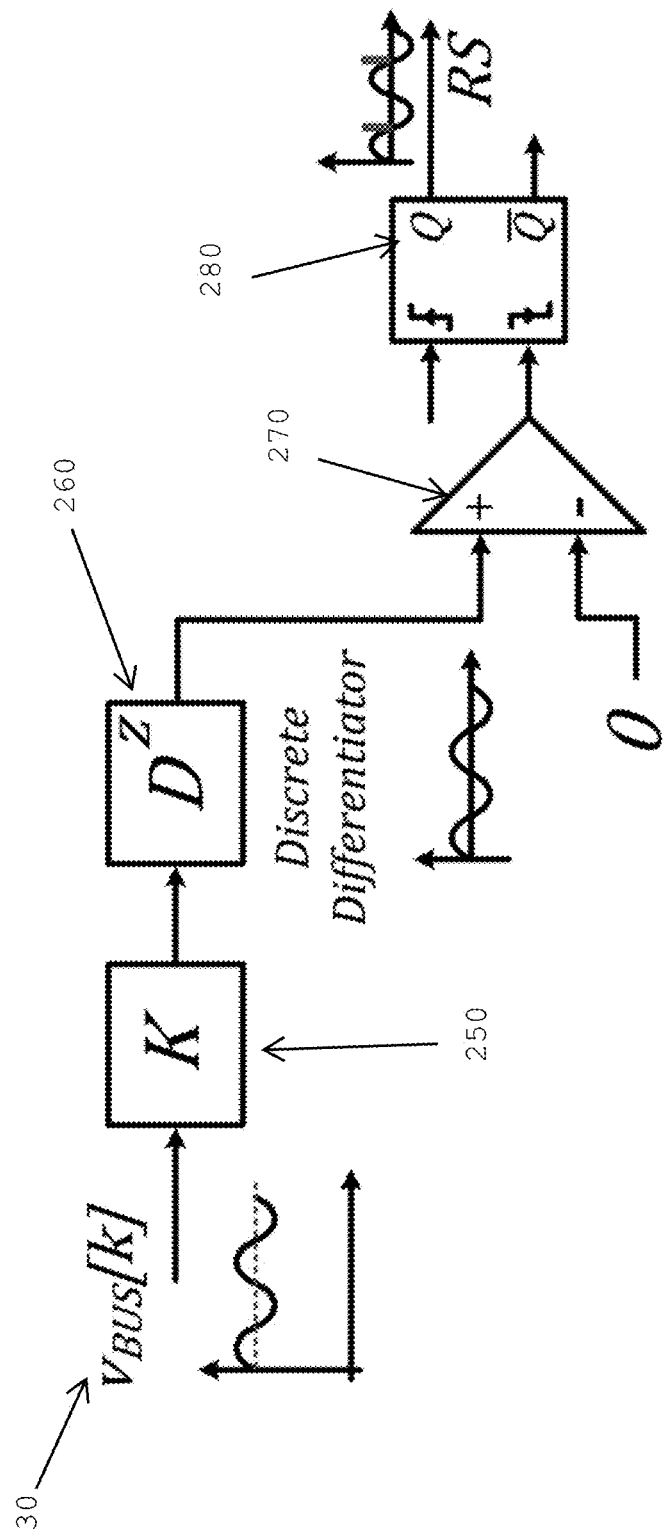
FIG. 8 shows an implementation of an auxiliary compensation block according to one aspect of the invention.

FIG. 8 shows the implementation of the auxiliary compensation block 240. In FIG. 8 the input to the block 240 (output voltage 30) is multiplied by a value K by way of block 250. The output of block 250 is then received by a discrete differentiator 260. The discrete differentiator 260 is used to extract the low frequency ripple of the output voltage 30. The output from differentiator 260 is then sent to a comparator 270 and the comparator 270's output is then sent to a latch block 280 that triggers whenever the signal from the differentiator passes zero with a negative slope. The produced signal from the differentiator 260 is used to create the reset signal for the inductor current estimation integrator 100 from FIG. 7. It is worthwhile to note that a discrete differentiator 260 is used in this block diagram in order to avoid any switching noise amplification. A sample-and-hold (S/H) circuit in the discrete differentiator, $D^z$, (block 260) is able to effectively filter out the switching noise, resulting in a clean signal for the comparator 270. It should be noted that the sampling is synchronized with the switching frequency.

Section III: Stability Analysis of the Adaptive Nonlinear Observer

In this section, the stability of the adaptive nonlinear observer is investigated. In order to ensure that the estimation errors converge to zero, the asymptotic stability of the estimation error dynamics must be guaranteed with the proposed observer. By substituting Eqns. (19)-(21) into Eqn. (14), the derivative of the Lyapunov function is given by:

$$\dot{V} = -\theta \tilde{x}_2^2 - \theta \tilde{x}_2^2 \qquad (22)$$

According to Eqn. (22), the derivative of the Lyapunov function is negative semi-definite and it is not negative definite. Therefore, the asymptotic stability is not guaranteed by the Lyapunov theorem. Eqn. (22) only guarantees that the error dynamics are stable, meaning that the estimation errors are bounded. In the case of negative semi-definite derivatives, a very useful theorem is LaSalle's Invariance Principle. This Principle is used to analyse the asymptotic stability of autonomous systems. According to Eqns. (11) and (12), the error dynamics are autonomous. Thus, LaSalle's Invariance Principle can be used to analyse the asymptotic stability. This Principle states that if a $C^1$ Lyapunov function is found that satisfies the following conditions:
1. The Lyapunov function is positive definite,
2. The derivative of the Lyapunov function is negative semi-definite,
3. The Lyapunov function is radially unbounded, and,
4. $V(0) = \dot{V}(0) = 0$, then the set of accumulation points of any trajectory is contained in $\gamma$, where $\gamma$ is the union of complete trajectories contained entirely in the following set:

$$\Gamma: \{X: \dot{V}(X) = 0\} \qquad (23)$$

Figure 9:
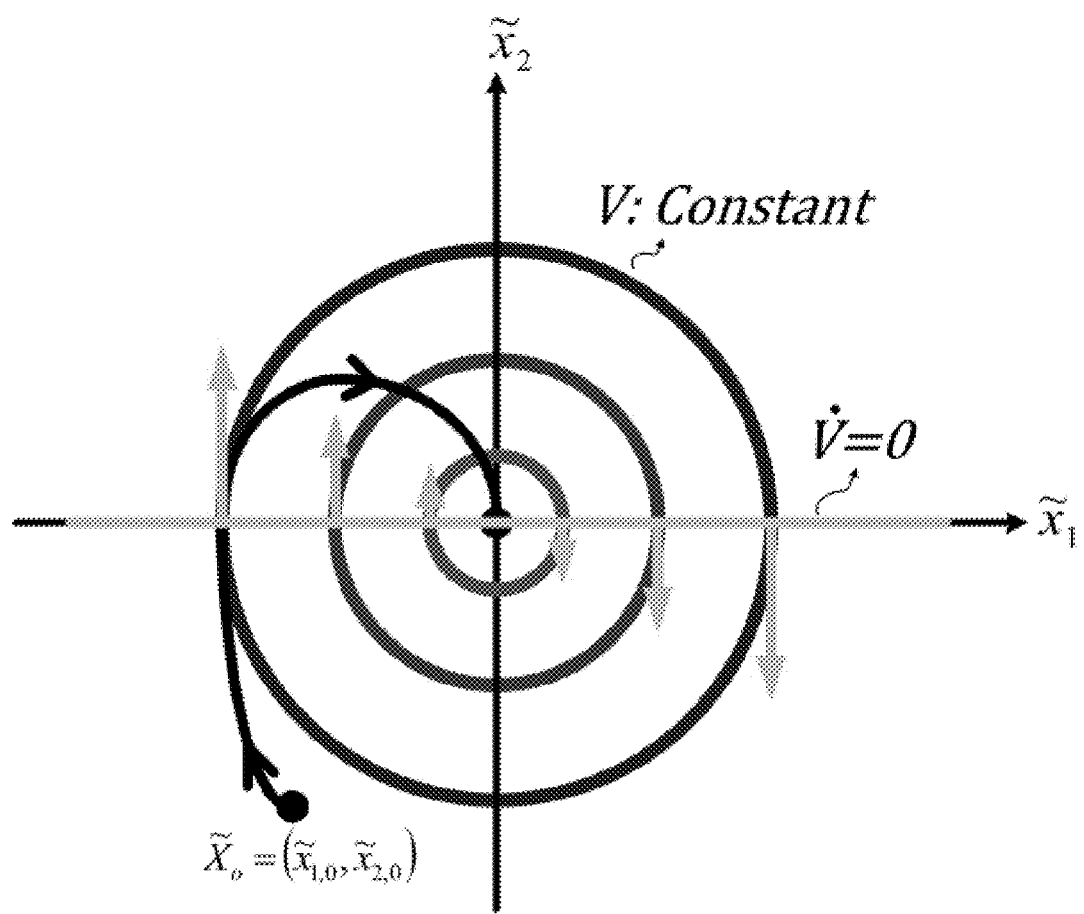
FIG. 9 shows a trajectory of the estimation error dynamics in the phase plane.

In particular, if $\gamma$ includes no trajectory of the system except the trivial trajectory $X(t) = 0$ for $t$ positive, then the system is globally asymptotically stable. The intuition behind this principle is that the system trajectory cannot get stuck on $\dot{V}(0) = 0$. FIG. 9 illustrates the trajectory of the estimation error dynamics in the phase plane. According to FIG. 9, $\tilde{x}_1$-axis is the set where $\dot{V}(0) = 0$. Once the system trajectory reaches to a set level (on which V is constant), V will not decrease at that point in the phase plane. Thus, the system trajectory goes out of the set $\Gamma: \{\dot{V}(X) = 0\}$ and $\Gamma$ is not an invariant set. Once the trajectory has passed $\Gamma$, the Lyapunov function decays to the equilibrium point. For this particular case, $\Gamma$ is given as follows:

$$\Gamma: \{\tilde{x}_2 = 0\} \qquad (24)$$

In this set, it is trivially concluded that:

$$\tilde{x}_2 = 0 \cdot \dot{\tilde{x}}_2 = 0 \qquad (25)$$

Applying Eqns. (25) to (12) results in:

$$\tilde{x}_1 = 0 \qquad (26)$$

Thus, $(\tilde{x}_1 = 0, \tilde{x}_2 = 0)$ is the asymptotic stable equilibrium of the error dynamics.

Section IV: Qualitative Analysis of the Adaptive Nonlinear Observer

Figure 10:
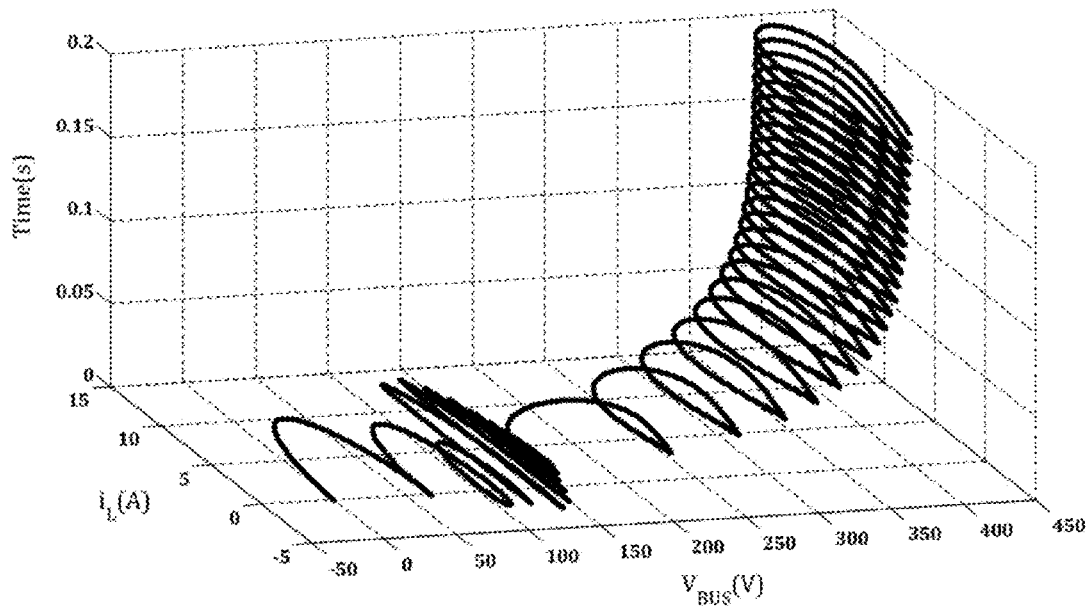
FIG. 10 shows a trajectory of the boost PFC.
Figure 11:
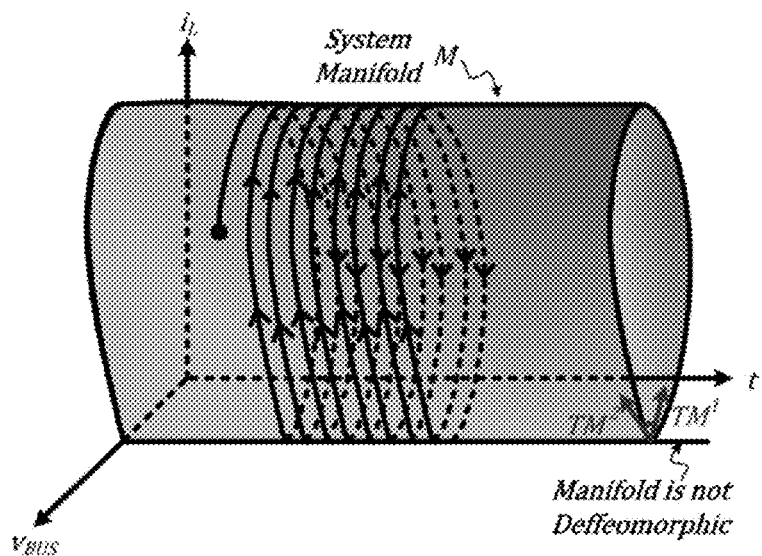
FIG. 11 shows a trajectory of the system on the manifold.

In this section, different features of the adaptive observer are presented. For this particular application, the characteristics of interest are the speed of convergence, the accuracy of the estimates and the robustness of the system. This section analyses the boost PFC converter from the differential geometric viewpoint. Since the system is nonlinear, the differential geometric analysis is able to offer good insight about the trajectory and the behaviour of the closed-loop control system. FIG. 10 shows the trajectory of the boost PFC. According to this figure, the system flow reaches a limit cycle after transients and the system flow remains there. The projection of the flow on the $(x_1, x_2)$-plane is the manifold of the system. The system manifold is smooth everywhere except when $x_1 = 0$. FIG. 11 illustrates the trajectory of the system on the manifold. According to this figure, the manifold loses its diffeomorphic characteristics when $x_1 = 0$. This shows the cause of losing observability. The line $x_1 = 0$ corresponds to the zero crossings of the current every half line cycle. Therefore, the system loses its controllability and observability at these points due to the singularity of the system flow at the zero crossings.

Figure 12:
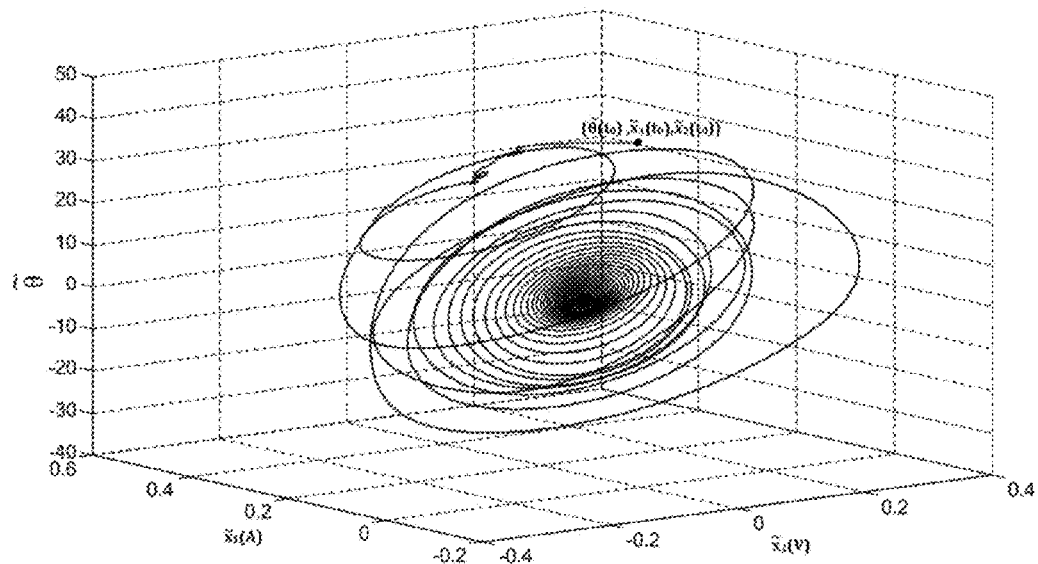
FIG. 12 illustrates how the adaptive observer estimates the inductor current, the output capacitor voltage and a specific parameter.
Figure 13:
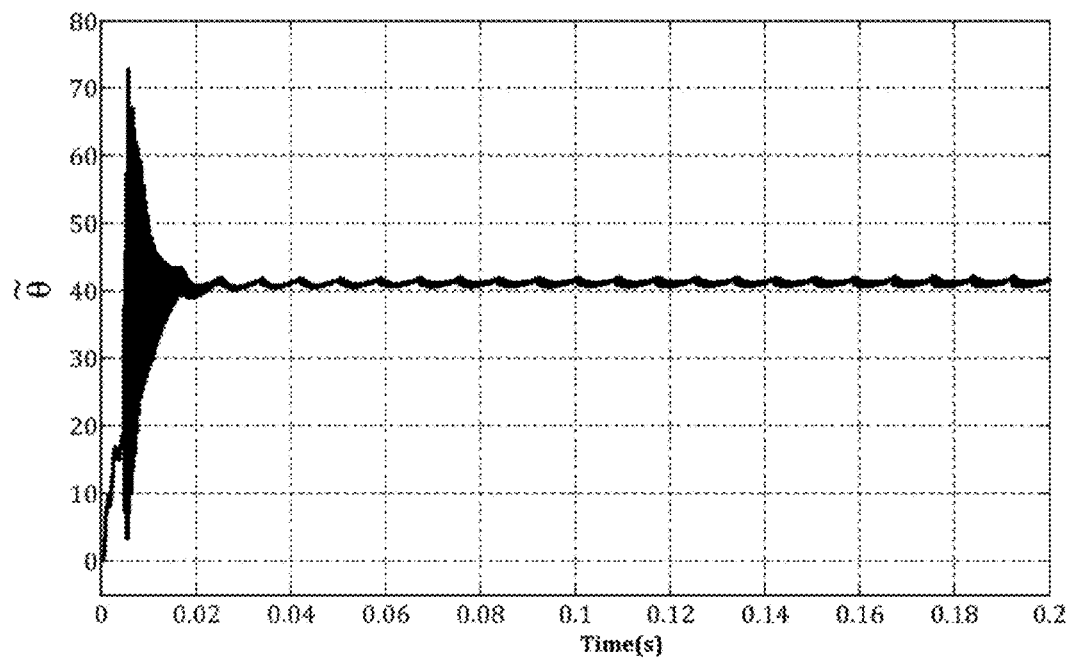
FIG. 13 illustrates the estimation of the value for θ.

As mentioned above, the other issue regarding the design of the state observer was the unknown load value. An adaptive algorithm is used to resolve this problem. The adaptive algorithm (or adaptive law) effectively estimates the load value for the adaptive observer. FIG. 12 shows the error dynamics of the adaptive observer. FIG. 12 shows that the observer precisely estimates the inductor current, the output capacitor voltage and the unknown parameter $\theta$. In particular, the estimation of $\theta$ is illustrated in FIG. 13. The convergence of $\hat{\theta}$ to its actual value $\theta$ is not guaranteed by the negative semi-definiteness of the Lyapunov function derivative or by LaSalle's Invariance Principle. In fact, the only thing that can be concluded from the stability analysis is the boundedness of $\hat{\theta}$. However, the particular structure of the adaptive observer provides the necessary and sufficient condition to prove the asymptotic convergence of the estimation error of $\theta$. The asymptotic convergence is proven by using the persistency of excitation concept. This concept states that if the update law is persistently excited, the global asymptotic stability is concluded for the estimation error. In particular, in order to have persistency of excitation, the following condition must be satisfied for two positive real values T and k:

$$\int_t^{t+T} \tilde{x}_2^2(\tau) d\tau \geq k > 0 \qquad (27)$$

Because there is inherently a low frequency ripple present at the DC-bus voltage, the update law is constantly being excited. In particular, by choosing $T = 1/(2\omega_{line} t)$ (half line cycle) and convergence of $\hat{x}_2$ to an arbitrary dc value with a double frequency ripple given by:

$$\|V_{ripple}\|_{peak} = \frac{P_{in}}{2\omega_{line}C_{BUS}V_{BUS}} \qquad (28)$$

the condition for the persistency of excitation concept is satisfied. Thus, the update law in the adaptive observer is persistently excited. The persistency of excitation concept proves the globally exponentially stable equilibrium point $(0,0,0)$ for $(\tilde{x}_1, \tilde{x}_2, \tilde{\theta})$.

Figure 14:
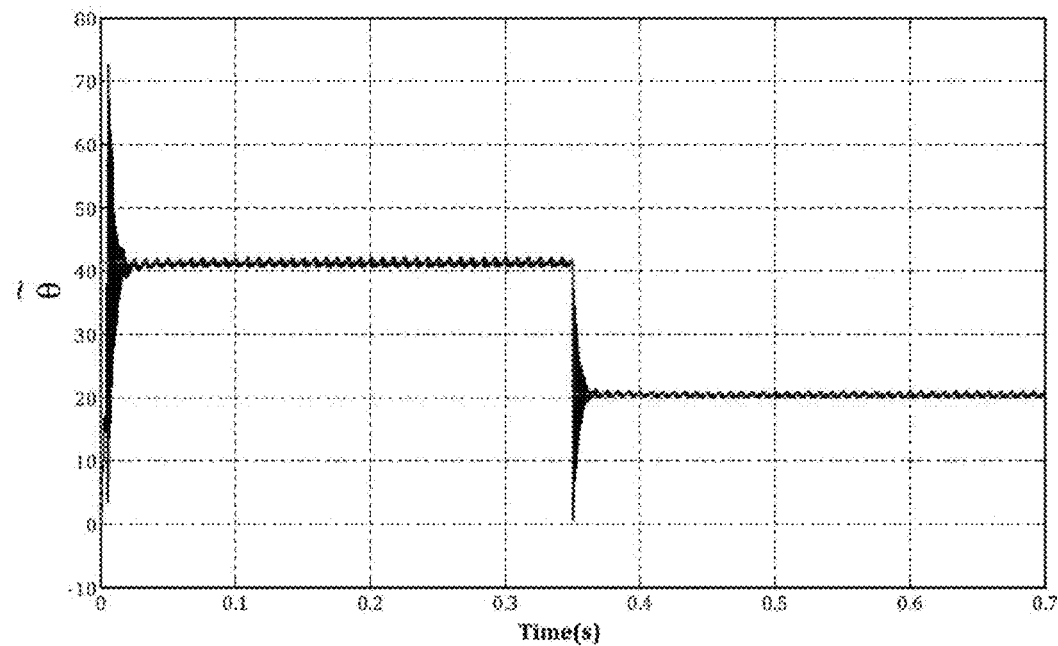
FIG. 14 shows the convergence of $\hat{\theta}$ to the actual value of θ.
Figure 15:
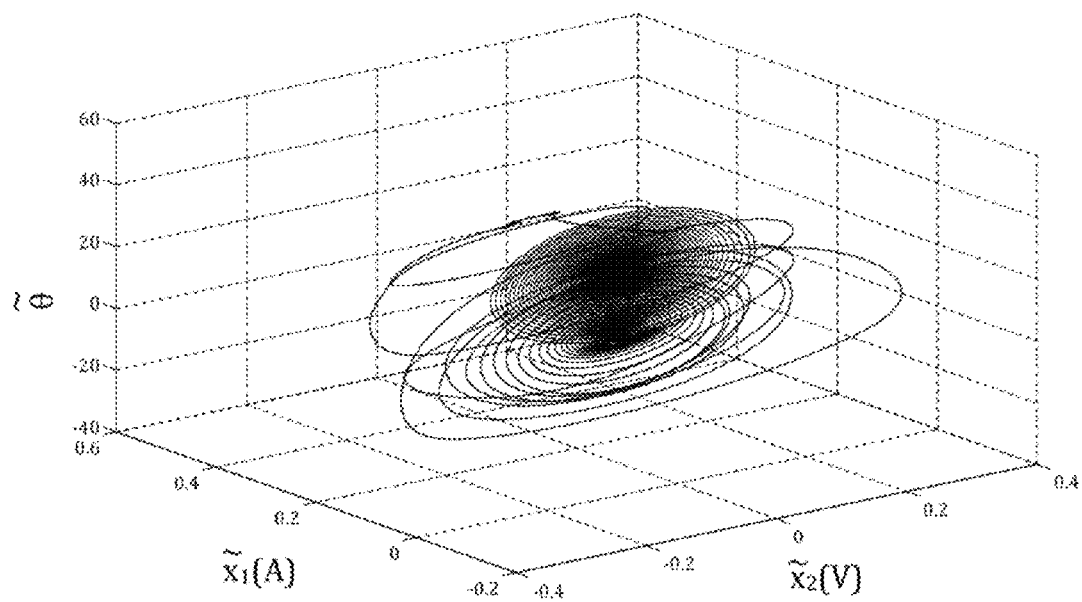
FIG. 15 shows the evolution of the error dynamics in $\Re^3$.
Figure 16:
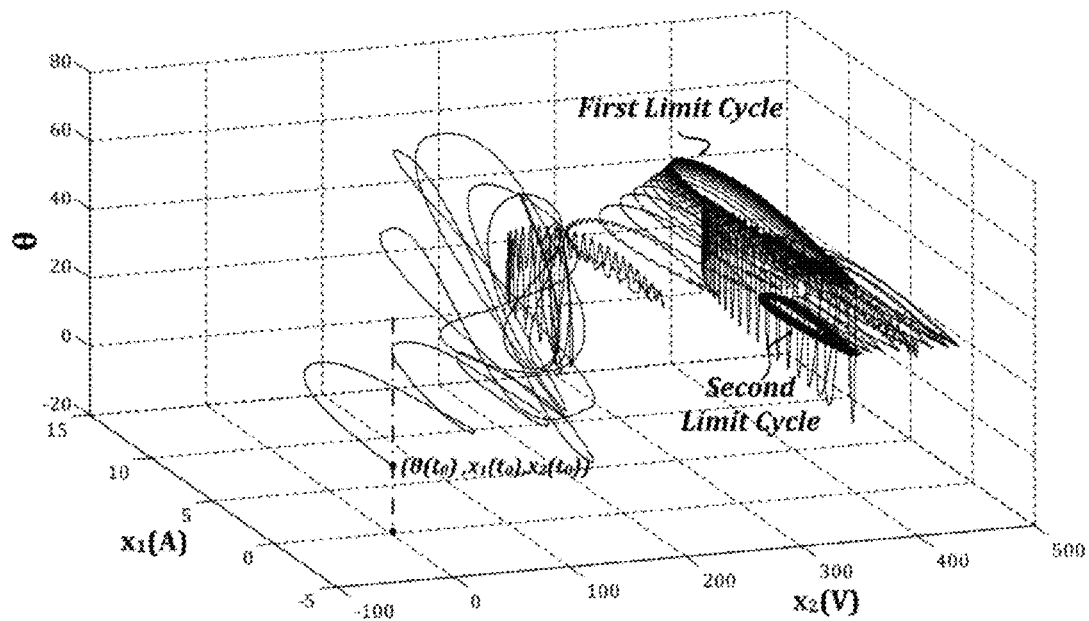
FIG. 16 illustrates the system trajectory in the state space when a 50% step change of load is applied to the system.

In order to show the performance of the parameter convergence, a 50% step reduction of the load is applied to the converter. FIG. 14 shows the convergence of $\hat{\theta}$ to the actual value $\theta$. This figure illustrates that the ripple present at the DC-bus voltage persistently excites the update law. Thus, $\hat{\theta}$ converges to the actual value $\theta$ during the load transients. Also, FIG. 15 shows the evolution of the error dynamics in $\Re^3$. This figure confirms the asymptotic stability of the error dynamics. FIG. 16 shows the system trajectory in the state space when the 50% step change of the load is applied to the system. This figure shows how the system flow converges to its limit cycle for each load condition. The first limit cycle is larger due to the higher inductor current and larger voltage ripple at the DC-bus.

Section V: Performance Analysis Through Simulation

In order to evaluate the performance of the adaptive nonlinear observer and the closed-loop control system, the converter is simulated using the PowerSim V9.2.1 simulator as well as MATLAB/SIMULINK. The simulation results for the nonlinear observer boost PFC converter are presented in this section. The converter specifications are given in TABLE I.

TABLE 1

Converter Specifications

| Symbol | Parameter | Value |
|---|---|---|
| $P_o$ | Output Power | 3 kW |
| $V_{BUS}$ | Output Voltage | 400 VDC |
| $v_g$ | Grid Voltage | 85-246 VAC |
| $f_{sw}$ | Switching Frequency | 120 kHz |
| L | Boost PFC Inductor | 570 μH |
| $C_{BUS}$ | DC-Bus Capacitor | 200 μF |

Figure 17:
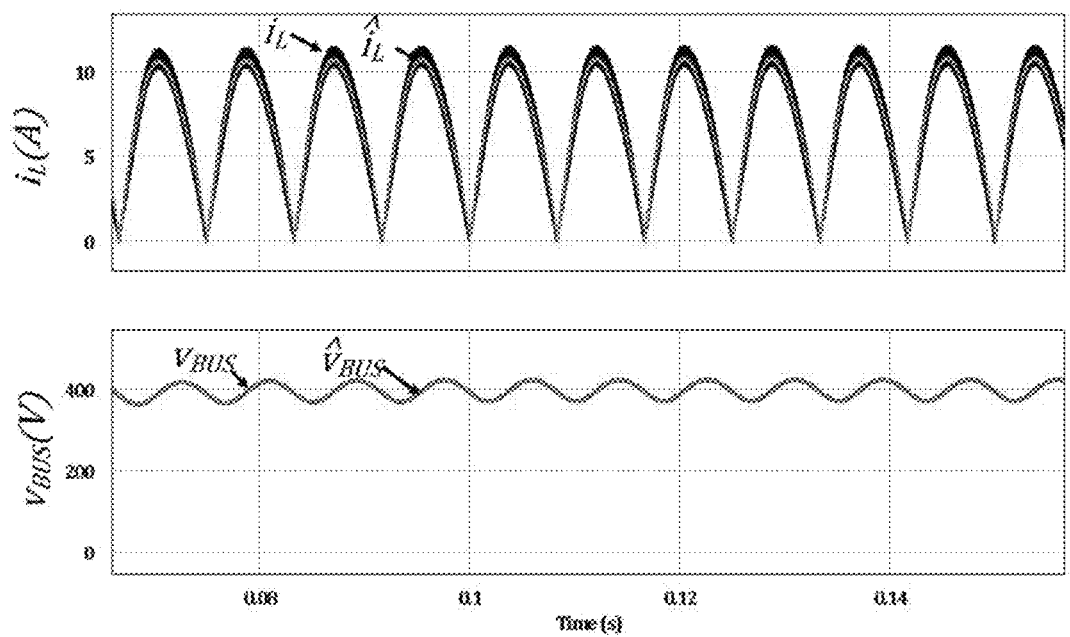
FIG. 17 illustrates the steady state performance of the adaptive observer.
Figure 18:
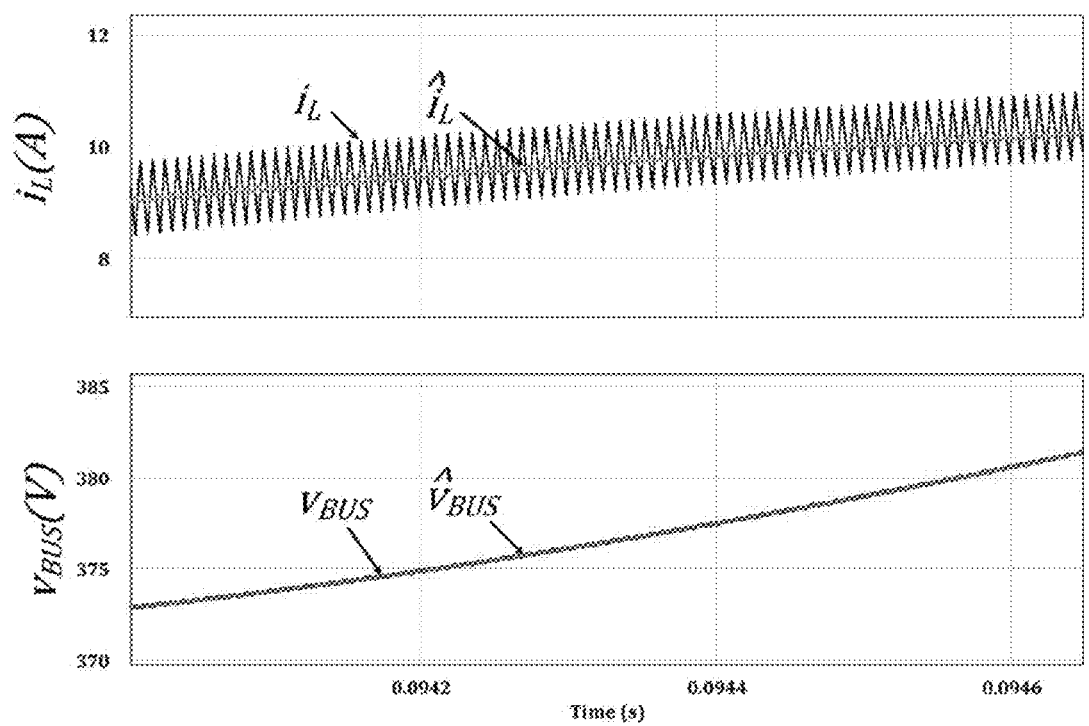
FIG. 18 is an enlarged version of FIG. 17.
Figure 19:
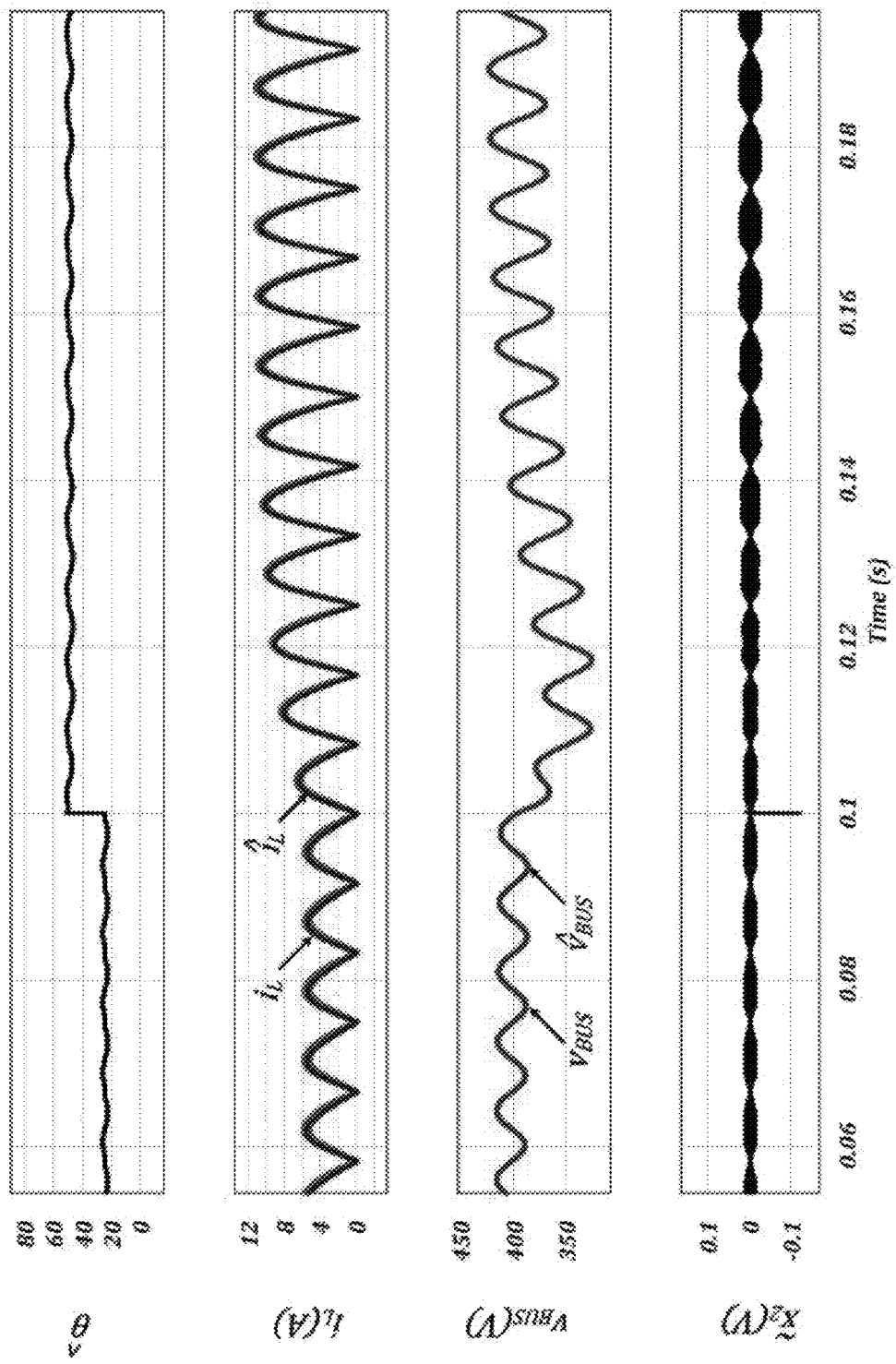
FIG. 19 shows the transient behaviour of the control system for the converter.
Figure 20:
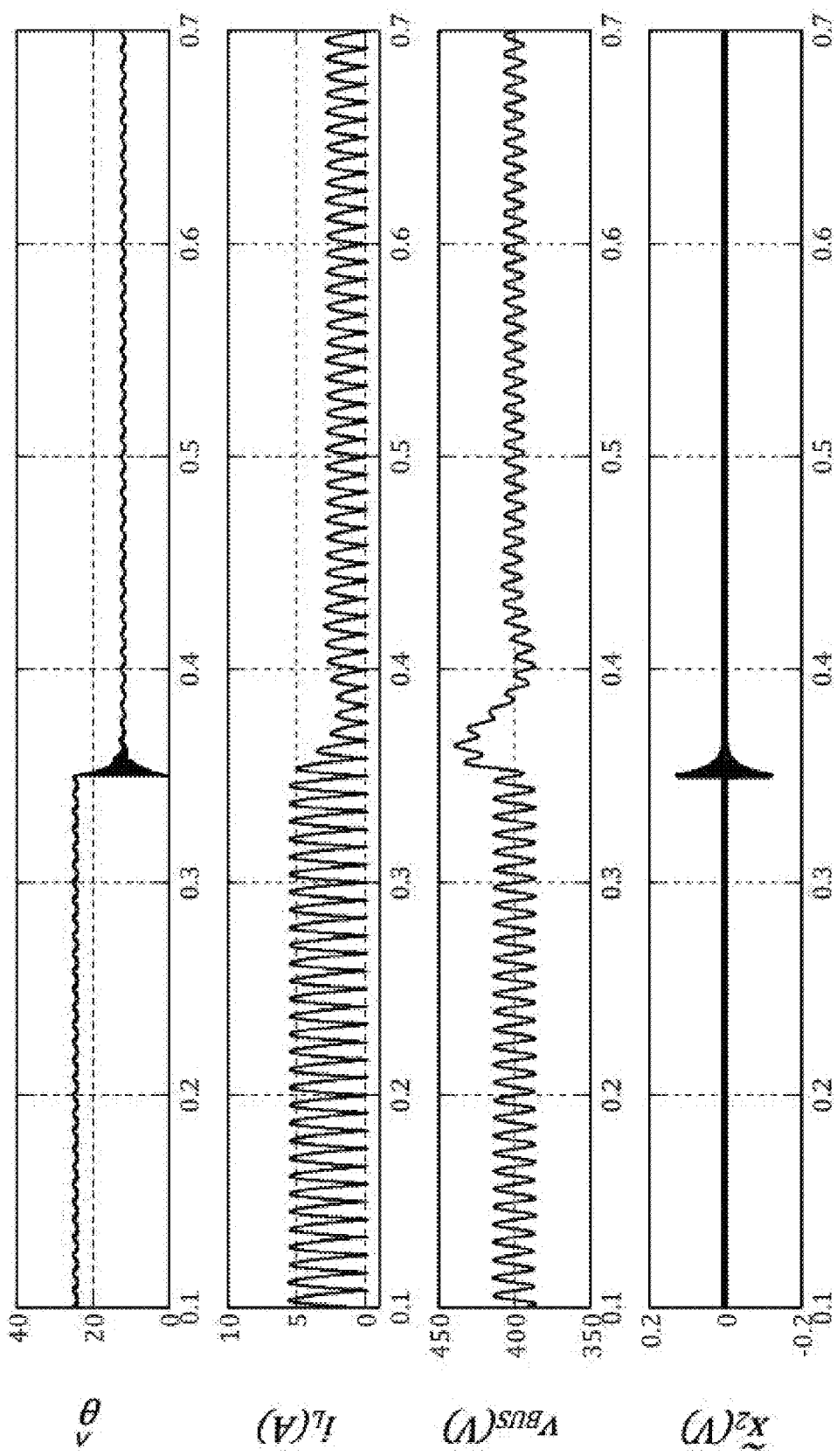
FIG. 20 show simulation results confirming the performance of the system.

FIG. 17 shows the steady-state performance of the adaptive observer and FIG. 18 is the enlarged version of FIG. 17. These figures confirm the accuracy of the adaptive observer and demonstrate stable performance of the current sensorless closed-loop control system. FIG. 19 shows the transient behaviour of the control system for the converter. This figure shows the very fast tracking of the adaptive observer. The top figure shows how the adaptive law updates the parameter $\hat{\theta}$ based on the load condition. In this figure, a step change to the load is applied at t=1 s to the output of the converter. The observer promptly adapts itself to the new load condition through the adaptive law. As mentioned in the previous section, due to the persistency of excitation, $\hat{\theta}$ converges to the actual value. FIG. 19 shows stable performance of the closed-loop control system under severe load variations. In order to confirm the consistency of the simulation results obtained from PowerSim, the closed-loop control system is simulated using MATLAB/SIMULINK. FIG. 20 shows the SIMULINK simulation results. This figure shows that the results are consistent with the ones obtained from PowerSim. The simulation results presented in this section demonstrate the superior performance of the current sensorless control system in steady-state as well as during the transients.

Section VI: Experimental Results

In order to verify the performance of the adaptive observer for an AC/DC converter, the adaptive observer was implemented on a 3 kW industrial AC/DC converter. The specifications of the converter are listed in TABLE II below.

TABLE II

Converter Specifications

| Symbol | Parameter | Value |
|---|---|---|
| $P_o$ | Output Power | 3 kW |
| $V_{BUS}$ | Output Voltage | 400 VDC |
| $v_g$ | Grid Voltage | 85-246 VAC |
| $i_{in,max}$ | Maximum Input Current | 32 A |
| PF | Power Factor | >98% |
| $f_{sw}$ | Switching Frequency | 100 kHz |
| EMI | EMI Standard | CISPR25/12 |
| $P_{min}$ | Minimum Load | 0 W |

Figure 21:
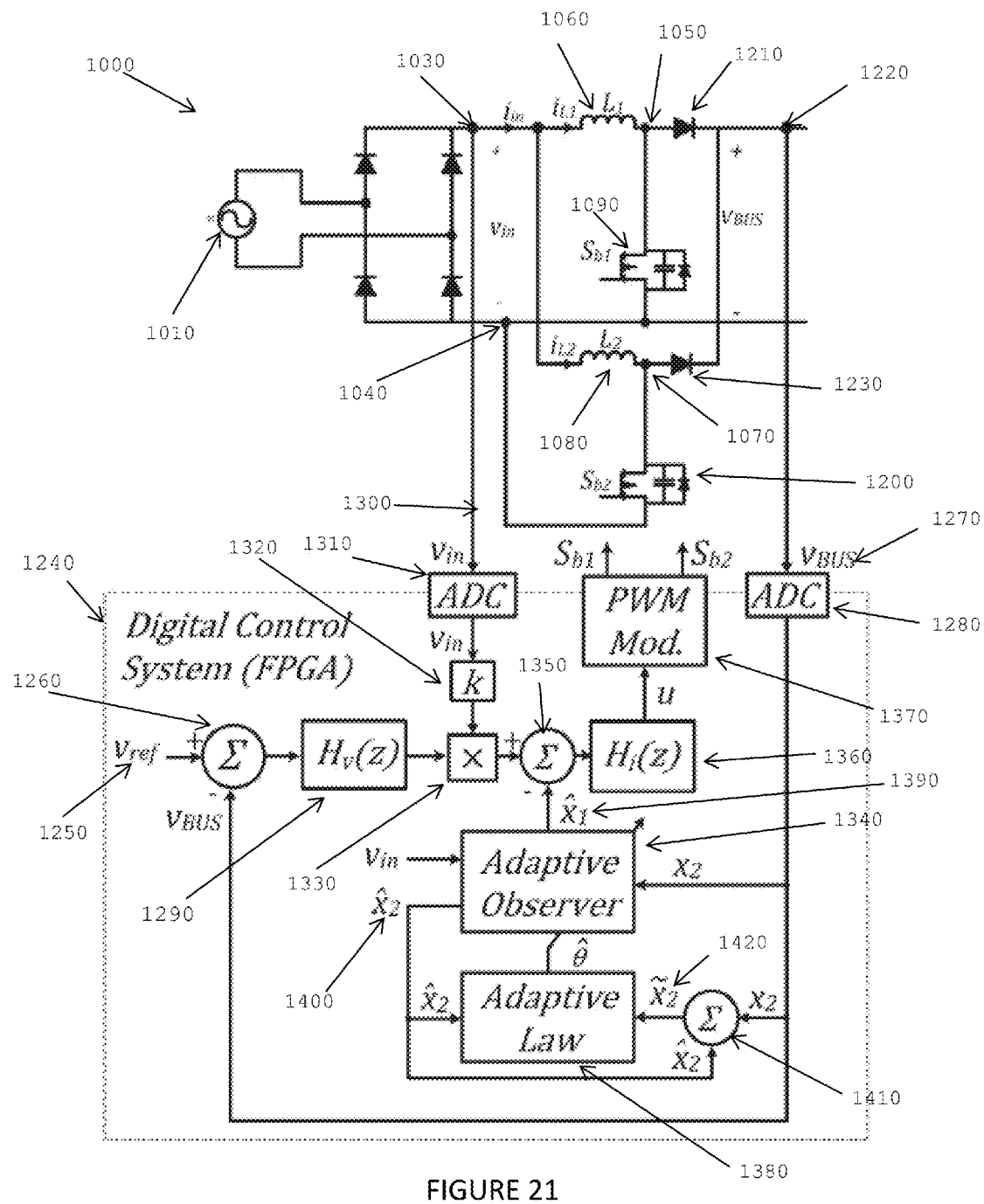
FIG. 21 is a block diagram of the converter showing the control system according to one aspect of the invention attached to a two phase interleaved boost converter.

FIG. 21 shows the schematic of the converter. According to this schematic, a two-phase interleaved boost converter is used to implement the PFC. It should be noted that for such high power applications, a dual-channel boost converter is necessary to reduce high frequency ripple of the input ac current. Also in the prototype are inrush current protection circuitry and an EMI filter which are not shown in the schematic. The inrush current can be very high especially in high power applications due to a large capacitor required on the DC-bus in order to attenuate the second harmonic ripple present at the DC-bus in single-phase converters. The EMI filter is also required to comply with the industrial standards such as CISPR25/12.

The control system is implemented using a Field-Programmable Gate Array (FPGA). The FPGA is able to provide a very fast and reliable solution to digitally implement the sensorless control system. In particular, the Cyclone IV EP4CE22F17C6N from Altera is used as the core FPGA to implement the control system. This FPGA provides a very fast and cost-effective solution for the control of power converters. The nonlinear adaptive observer along with the voltage loop and current loop controllers are implemented using the VHSIC Hardware Description Language (VHDL). According to FIG. 21, there are two control loops along with the adaptive observer. The control loops and the observer are VHDL codes and are based on new IEEE "fixed-point" library, which is supported by VHDL-2008 compilers.

In FIG. 21 a two-phase boost PFC converter 1000 is illustrated. The converter 1000 is fed by an AC current source 1010 which is coupled to a diode bridge 1020. The diode bridge is coupled between a first coupling node 1030 and a second coupling node 1040. Between the first coupling node 1030 and a third coupling node 1050 is a first inductor 1060. Coupled between the first coupling node 1030 and a fourth coupling node 1070 is a second inductor 1080. Between the third coupling node 1050 and the second coupling node 1040 is a first power semiconductor subcircuit 1090. A second power semiconductor subcircuit 1200 is coupled between the second coupling node 1040 and the fourth coupling node 1070. Also part of the converter 1000 is a first output diode 1210 coupled between a positive output node 1220 and the third coupling node 1050. A second output diode 1230 is coupled between the fourth coupling node 1070 and the positive output node 1220. The second coupling node 1040 serves as a negative output node.

A control system 1240 is coupled to the converter to receive input from the converter and to provide control signals for the power semiconductor subcircuits 1090, 1200. For this control system 1240, a reference voltage 1250 is sent to a summing block 1260. The output voltage 1270 between the positive and negative output nodes of the converter 1000 is sensed and converted to a digital signal by way of an analog to digital converter 1280. The digital version of this output voltage 1270 is subtracted from the reference voltage 1250 by way of the summing block 1260. The result of summing block 1260 is received by block 1290 which uses the result to determine a transfer function for the voltage characteristics of the converter.

The other input to the control system 1240 is the input voltage 1300 which is the voltage between the first coupling node 1030 and the second coupling node 1040. The input voltage 1300 is digitally converted by way of the analog to digital converter 1310. The digital version of the input voltage 1300 is multiplied by a constant k by block 1320 and multiplied by multiplier block 1330 with the result of block 1290. The result of the adaptive observer 1340 is subtracted from the result of the multiplier block 1330 by way of summing block 1350. The result of this summing block 1350 is fed into block 1360 that uses this result as an input for a transfer function for the current characteristics of the converter 1000. The output of the block 1360 is the value u which is related to the input duty ratio as noted above. This value u is then used by a pulse width modulation block 1370 to determine control signals for the first power semiconductor subcircuit 1090 and for the second power semiconductor subcircuit 1200.

The adaptive observer block 1340 receives, as input, the input voltage 1300 as well as the output voltage 1270 and the output of the adaptive law block 1380. The adaptive observer block 1340 outputs, in addition to the estimate of the inductor current 1390, an estimate of the output voltage 1400. This estimate 1400 is fed to the adaptive law block 1380 and to a summing block 1410. The summing block 1410 also receives the sensed output voltage 1270 and outputs to the adaptive law block 1380 the error estimate 1420 for the output voltage of the converter 1000.

Figure 21A:
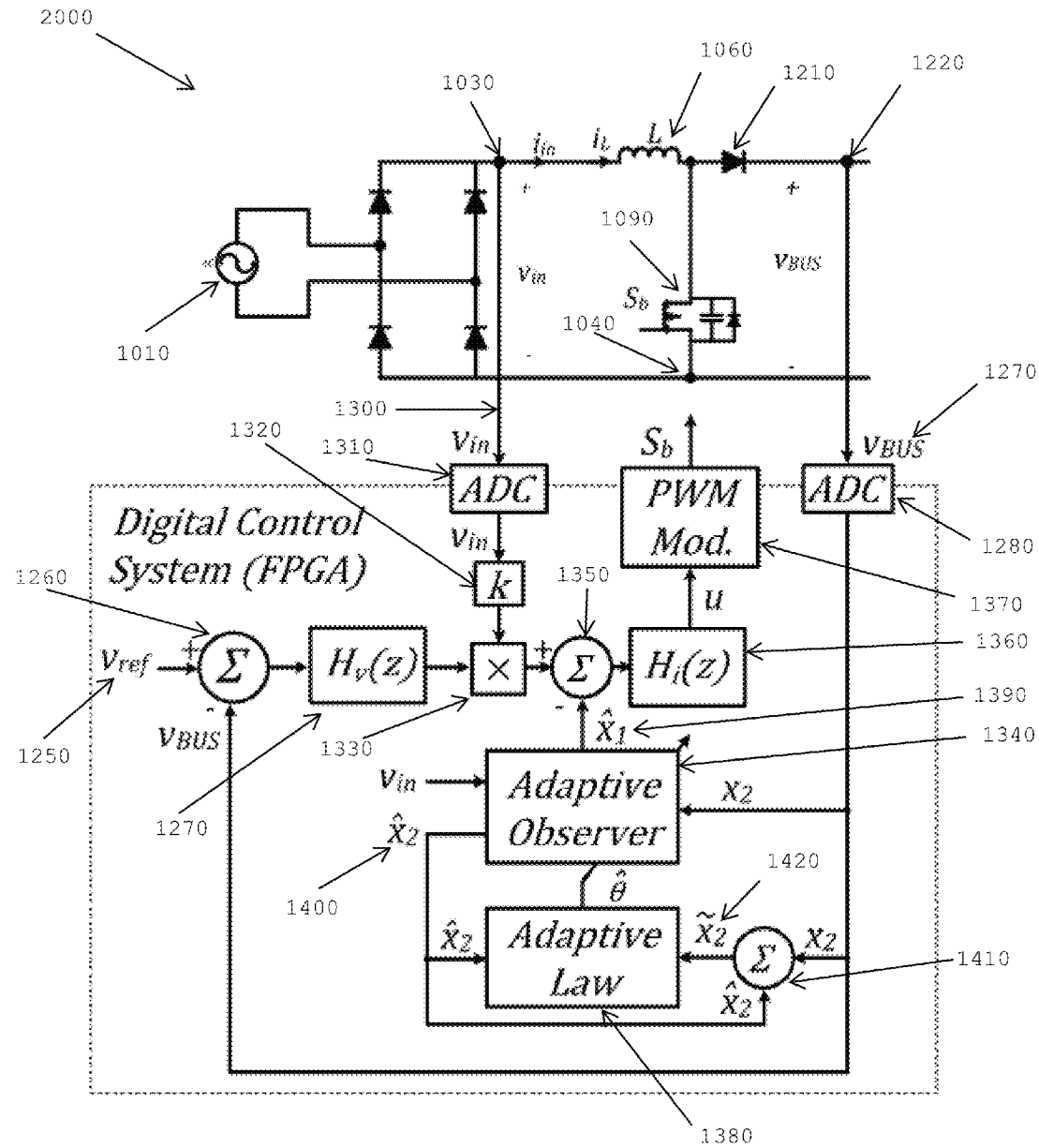
FIG. 21A is a block diagram of the converter showing the control system according to one aspect of the invention attached to a full-bridge PWM converter.

It should be noted that the control system and adaptive observer according to various aspects of the invention may be used with other types of PFC boost converters. In FIG. 21, the control system and adaptive observer are used to control a two-phase boost converter. Referring to FIG. 21A, a more general PFC boost converter using the control system and adaptive observer of the invention is illustrated. The system 2000 in FIG. 21A is identical to that in FIG. 21 with the exception that there is only one power semiconductor subcircuit 1090 and there is only one inductor 1060 and one diode 1210. Accordingly, the fourth coupling node has been removed along with the second power semiconductor subcircuit, the second inductor and the second output diode. The pulse width modulation block 1370 only outputs a single control signal for the power semiconductor subcircuit 1090.

Figure 22:
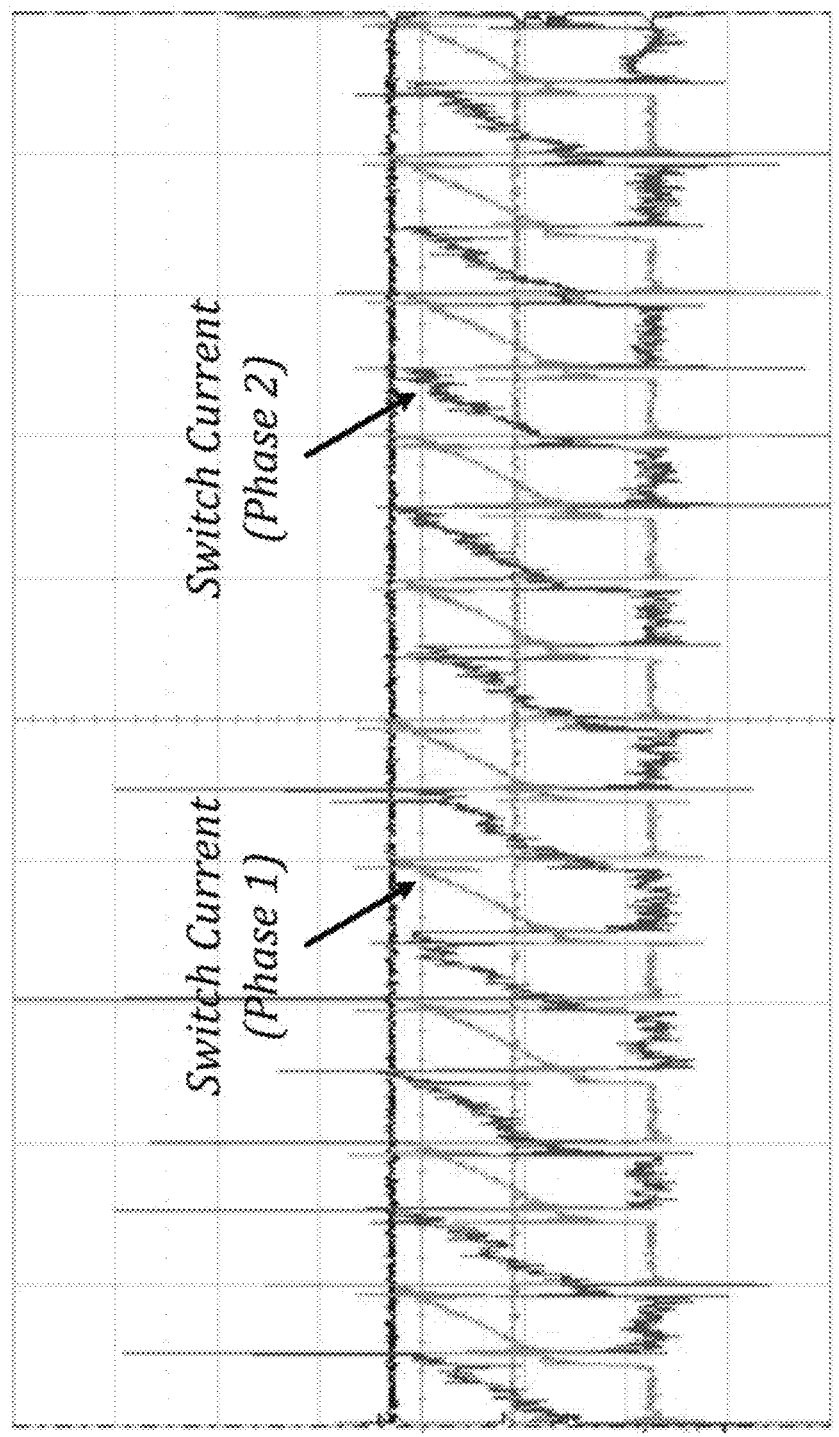
FIG. 22 illustrate the outputs of a system using current sensors.
Figure 23:
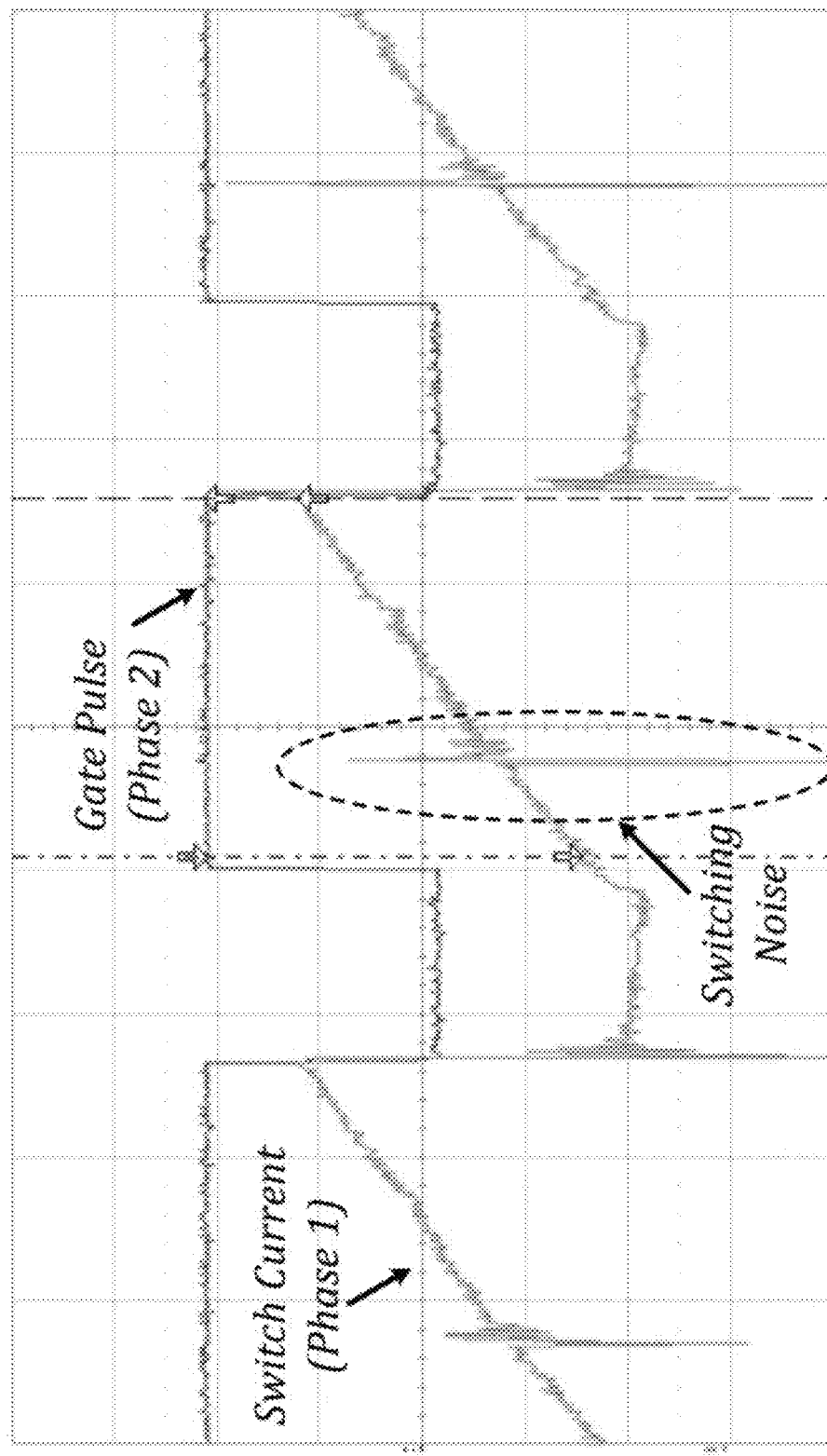
FIG. 23 is an enlarged version of the current signal of FIG. 22.

In order to appreciate the practical advantages of the current observer for the boost PFC AC/DC converter, a typical current sensor is implemented by placing the current transformers in series with the power semiconductor. FIG. 22 shows the outputs of the current sensors for the two phases of the interleaved boost converter. This figure shows a very noisy current signal to be used in the current feedback control loop. The enlarged version of the current signal is also shown in FIG. 23. This figure illustrates that the switching noise from one phase may highly affect the current signal of another other phase at random intervals. From this, it can be seen that if the start of conversion for ADC coincides with the switching noise, the control loop cannot maintain its stability. This is a very serious issue in practical circuits where reliability is paramount. This noise can be mitigated by using capacitive filters. However, the filters introduce delay into the control loop and this delay highly degrades the stability and reliability of the system. For low power applications (i.e. applications which use less than 1 kW) the switching noise may not be significant, nevertheless filtering is required and the performance is compromised accordingly. However, for higher power applications the switching noise can be very high and so will be the filtering requirement for proper noise removal.

Figure 24:
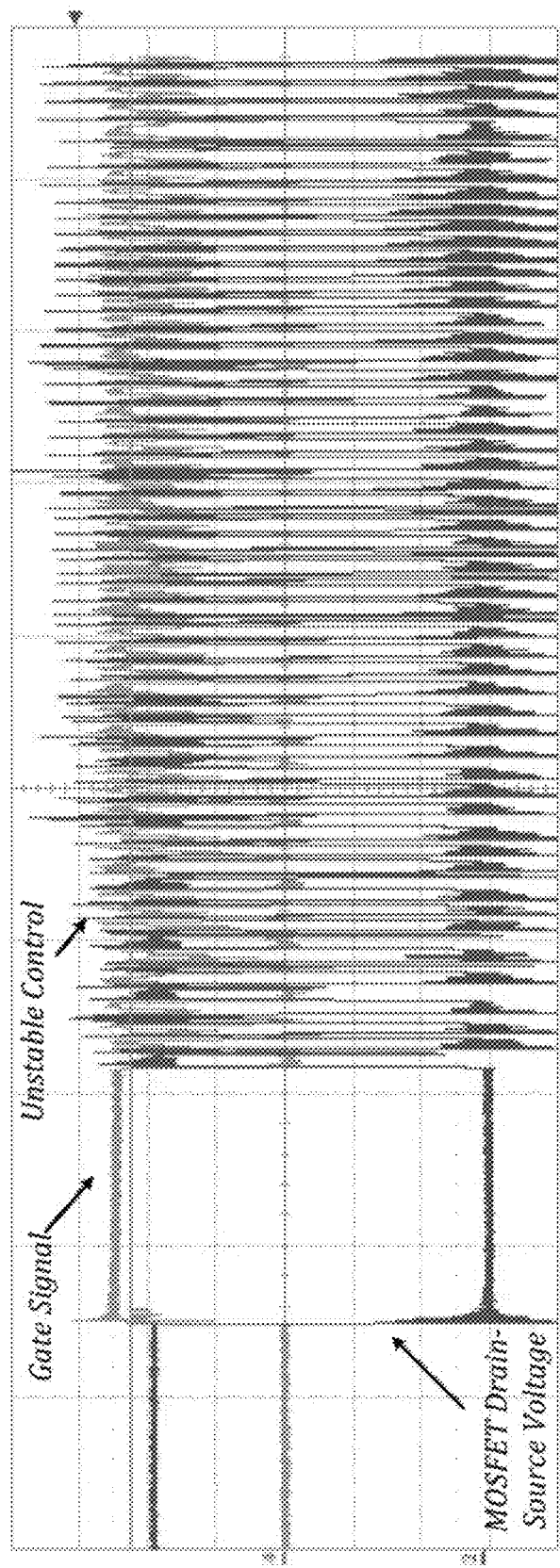
FIG. 24 illustrates waveforms showing how a closed-loop control system can lose stability due to noisy current feedback.
Figure 25:
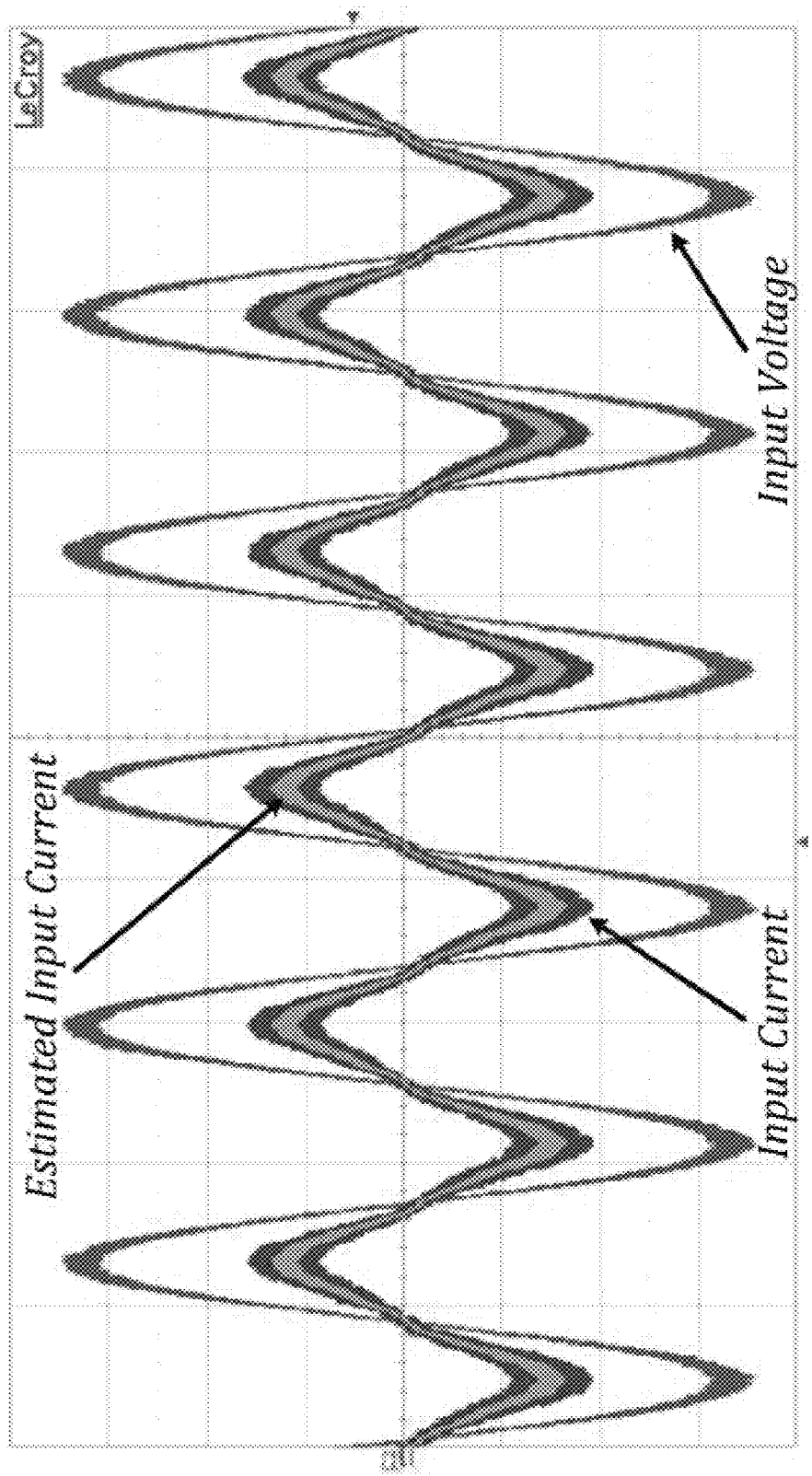
FIG. 25 illustrates the performance of the control system using the adaptive current observer according to one aspect of the invention.
Figure 26:
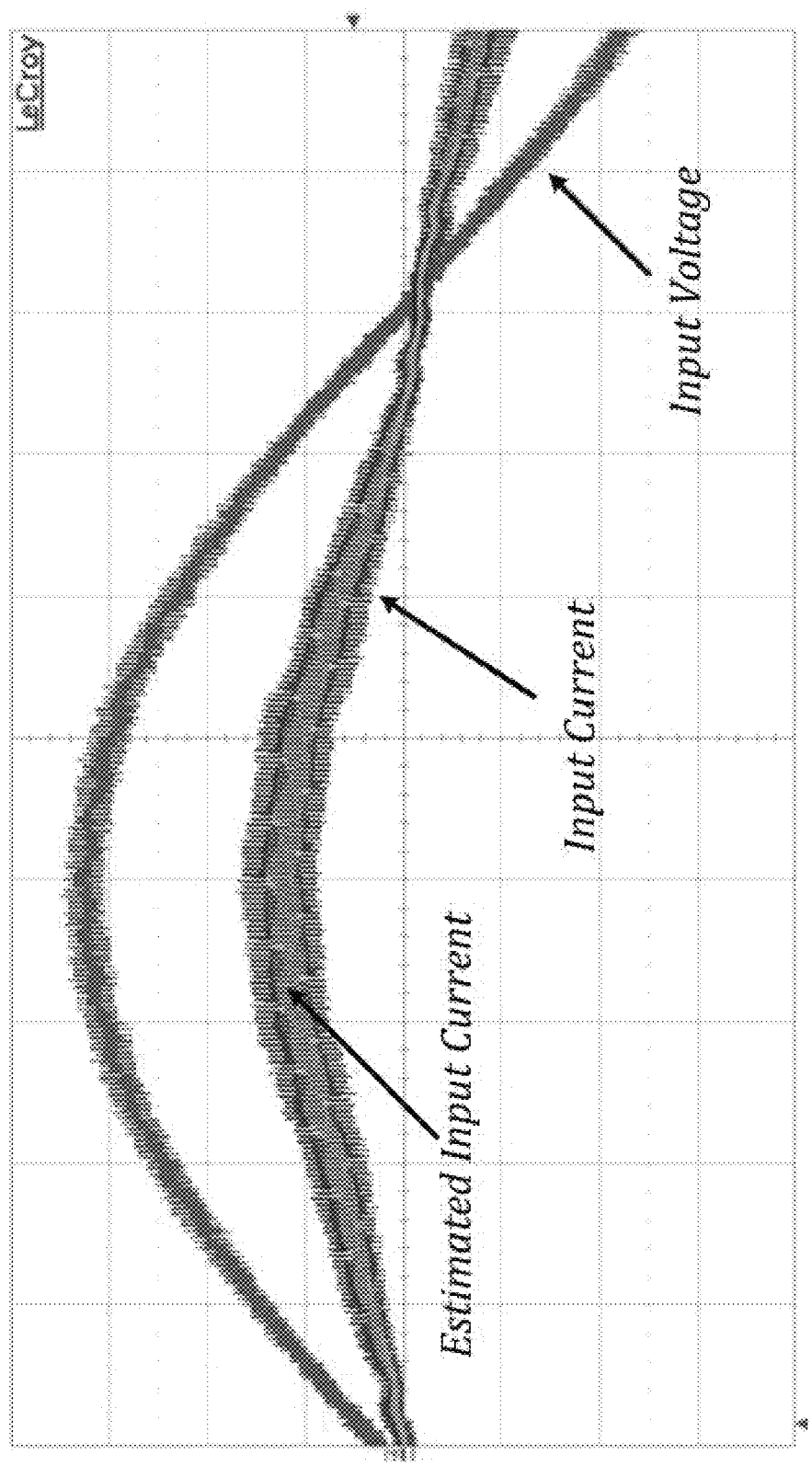
FIG. 26 is an enlarged version of FIG. 25.

FIG. 24 shows a situation where the closed-loop control system loses stability due to very noisy current feedback. This figure shows that the system reliability can be significantly jeopardised by the current sensor. FIG. 25 shows the performance of the closed-loop control system with the adaptive current observer. This figure demonstrates a very accurate estimation of the observer. FIG. 26 is the enlarged version of FIG. 25. It can be seen that the adaptive current observer can very precisely emulate the input inductor current. As well it can be seen that the resetting of the current observer during the zero crossings of the input AC voltage helps the observer deal with these singular operating points where the boost PFC converter loses observability of the inductor current.

Figure 27:
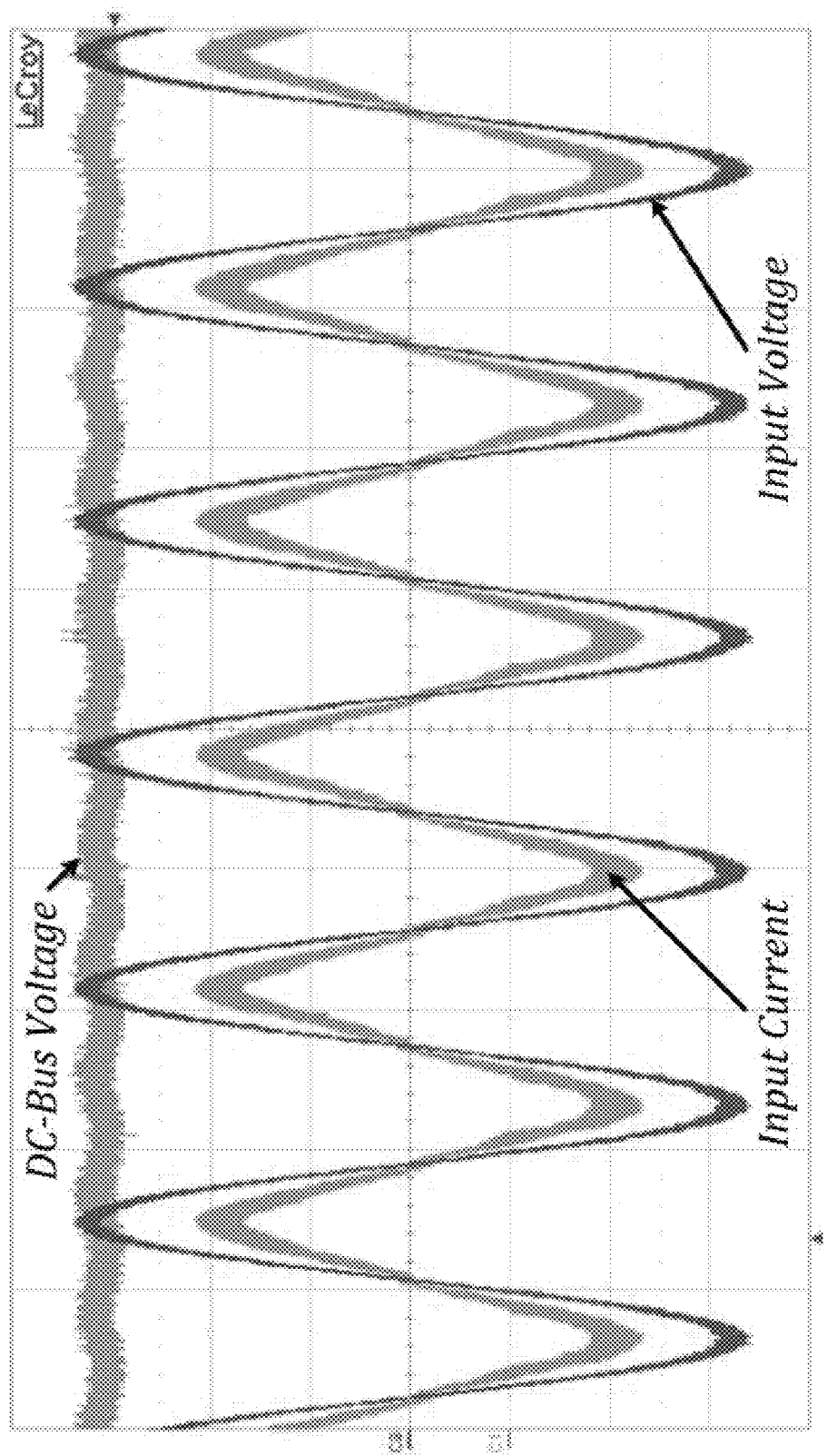
FIG. 27 shows the experimental waveforms for the PFC at full-load.
Figure 28:
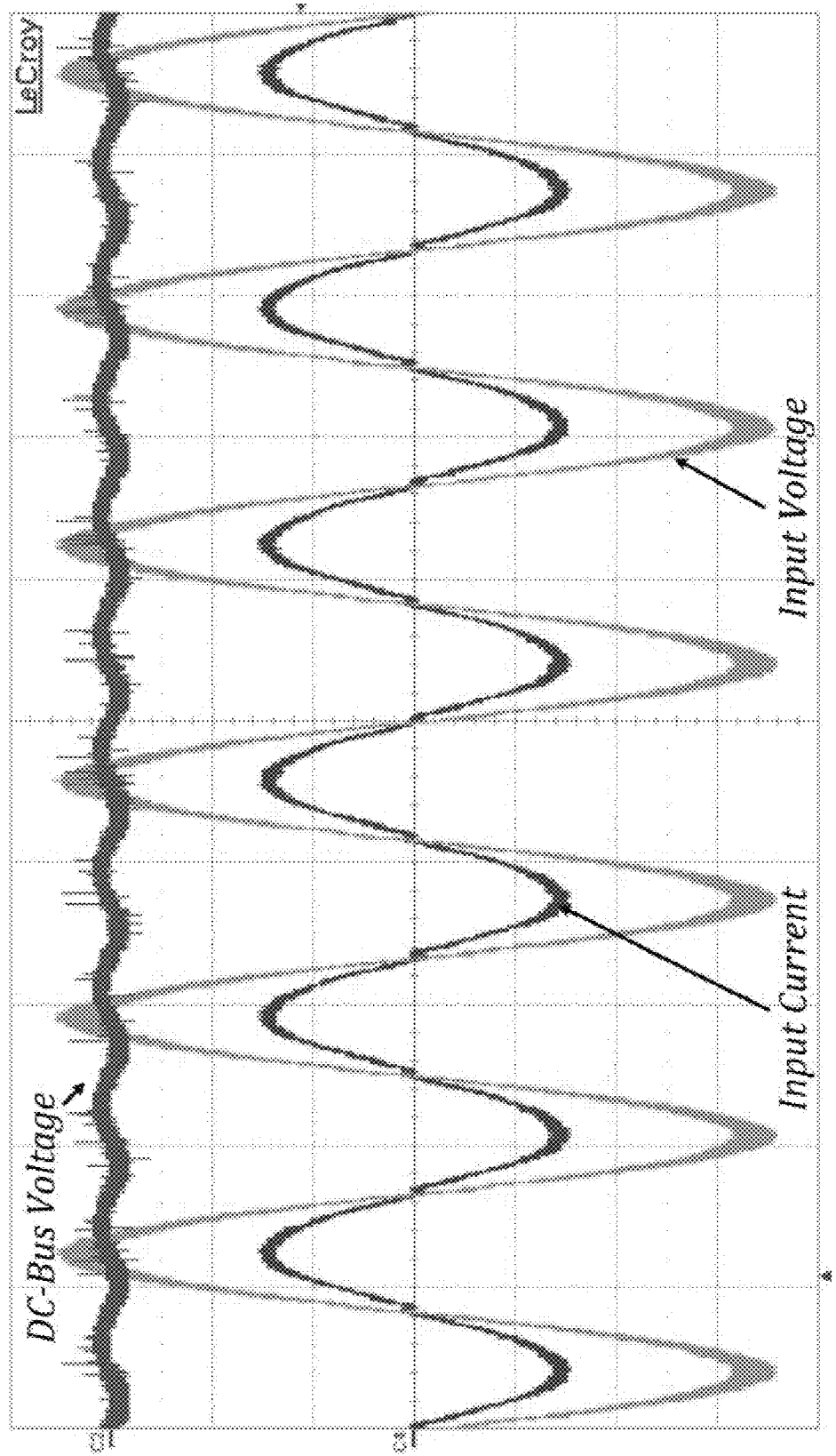
FIG. 28 illustrate the PFC waveforms for 80% of full load.
Figure 29:
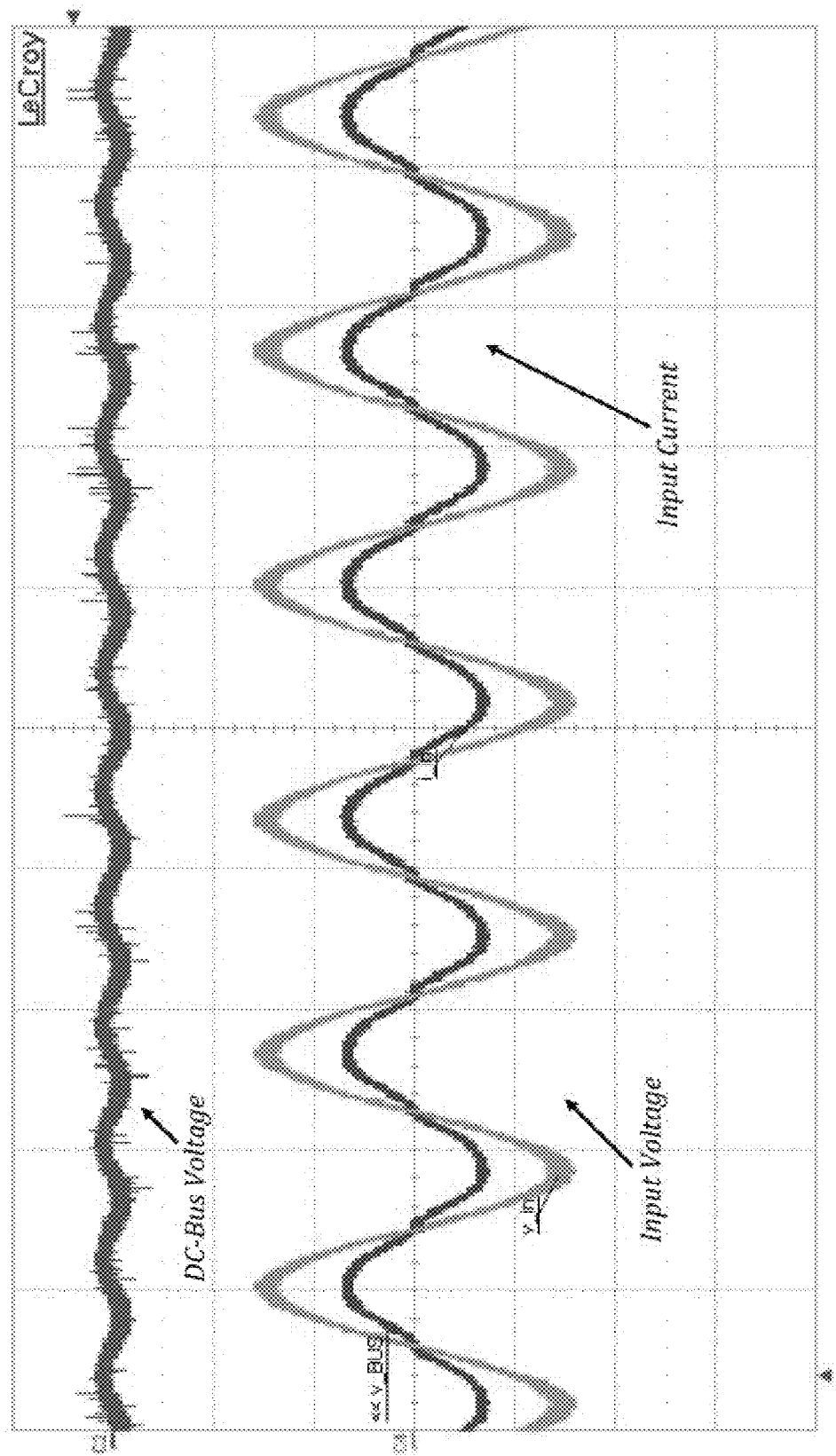
FIG. 29 illustrate the PFC waveforms for 40% of full load.
Figure 30:
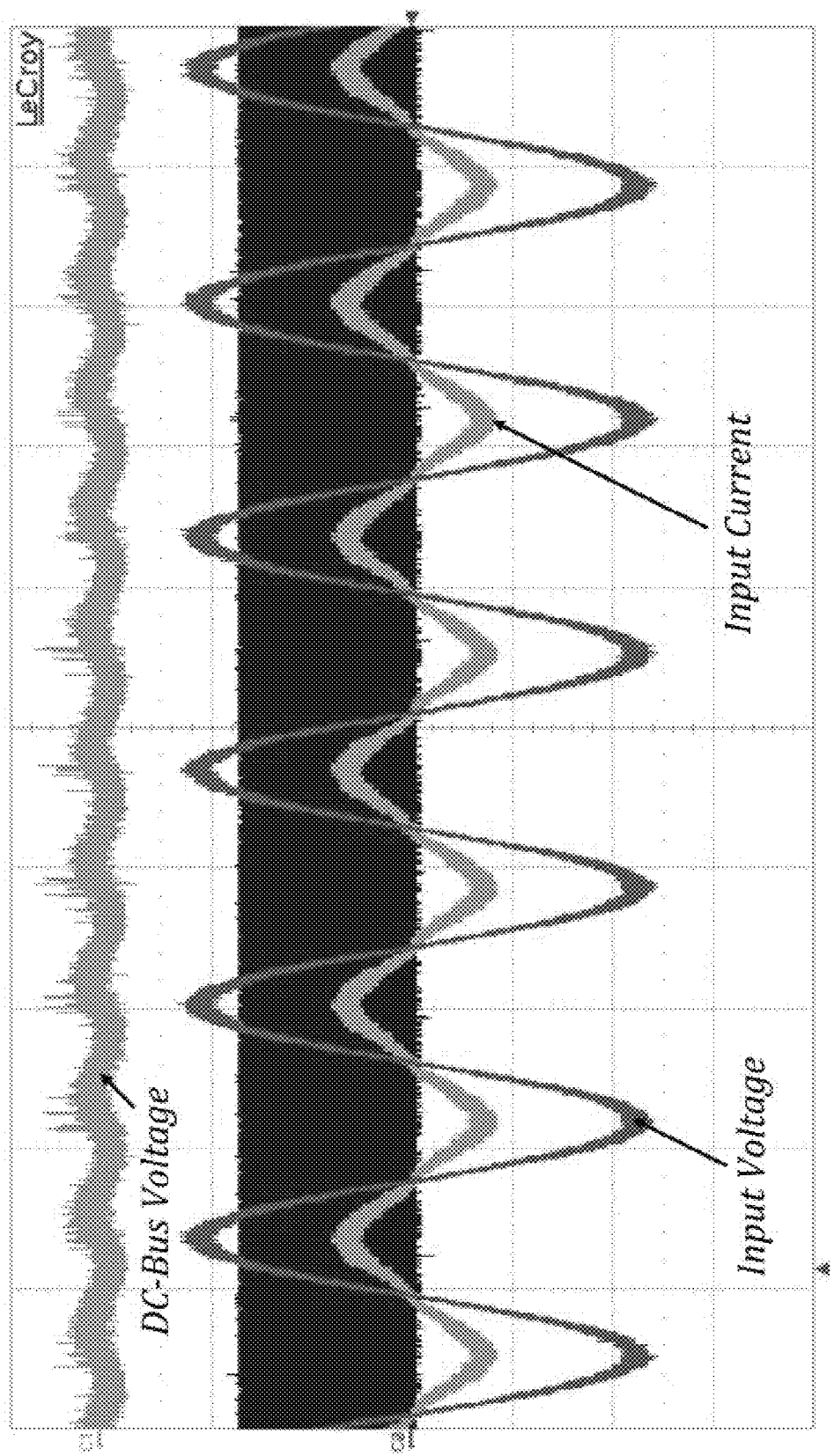
FIG. 30 illustrate the PFC waveforms for 10% of full load.

FIGS. 27-30 show the experimental results for the steady-state performance of the converter with the sensorless control system. FIG. 27 shows the experimental waveforms of the PFC at full-load. According to this figure, the converter drains a high quality current from the utility grid, with a very stable performance. Also, the input current and input AC voltage are in phase, thus maintaining a near unity power factor (0.997). FIG. 28, FIG. 29 and FIG. 30 present the PFC waveforms for 80%, 40% and 10%-load respectively. The experimental results from different load/line conditions confirm a stable and superior performance of the closed-loop control system.

Figure 31:
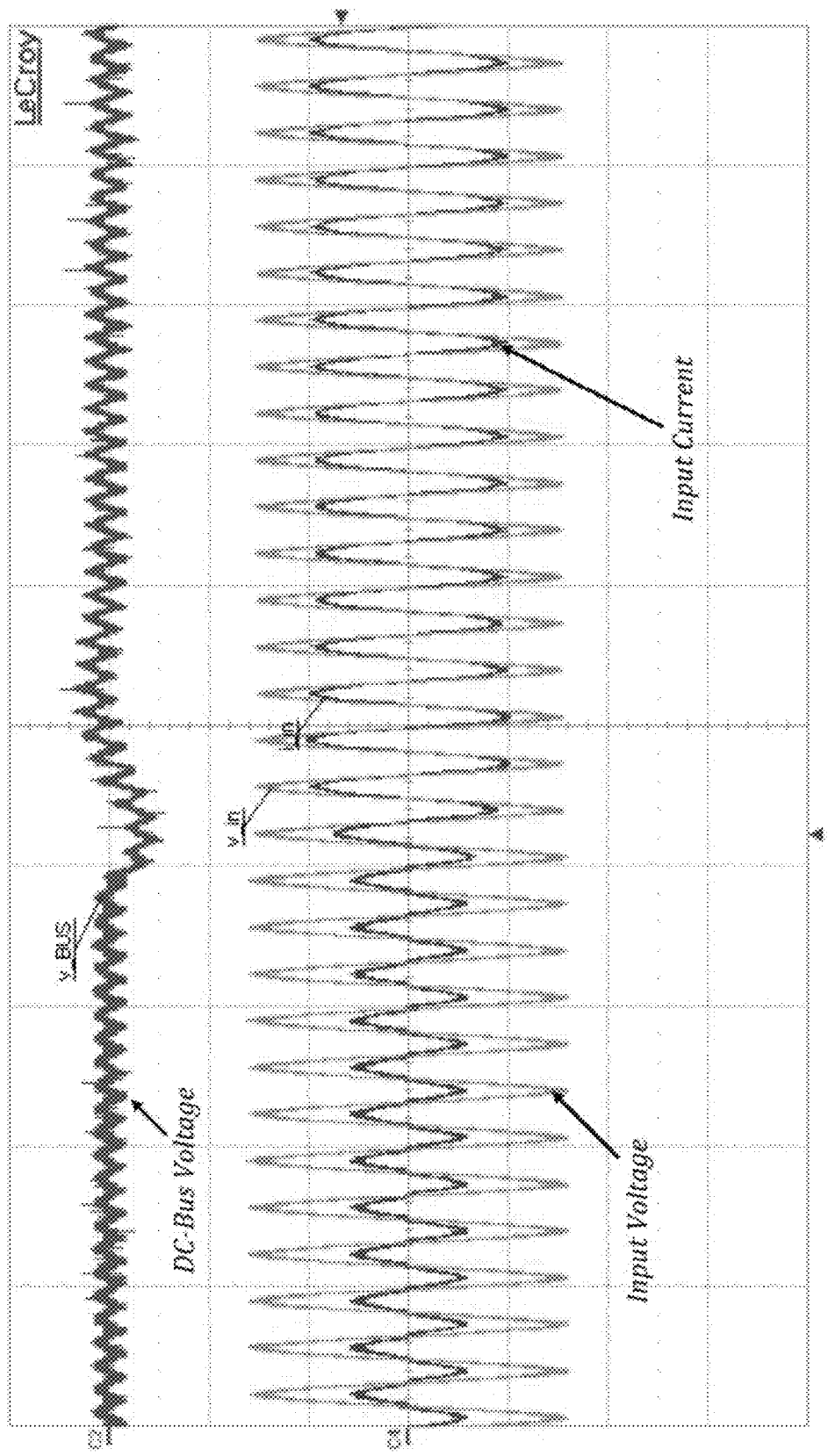
FIG. 31 show the transient response of the closed loop control system when a 50% positive step load change is applied to the converter.
Figure 32:
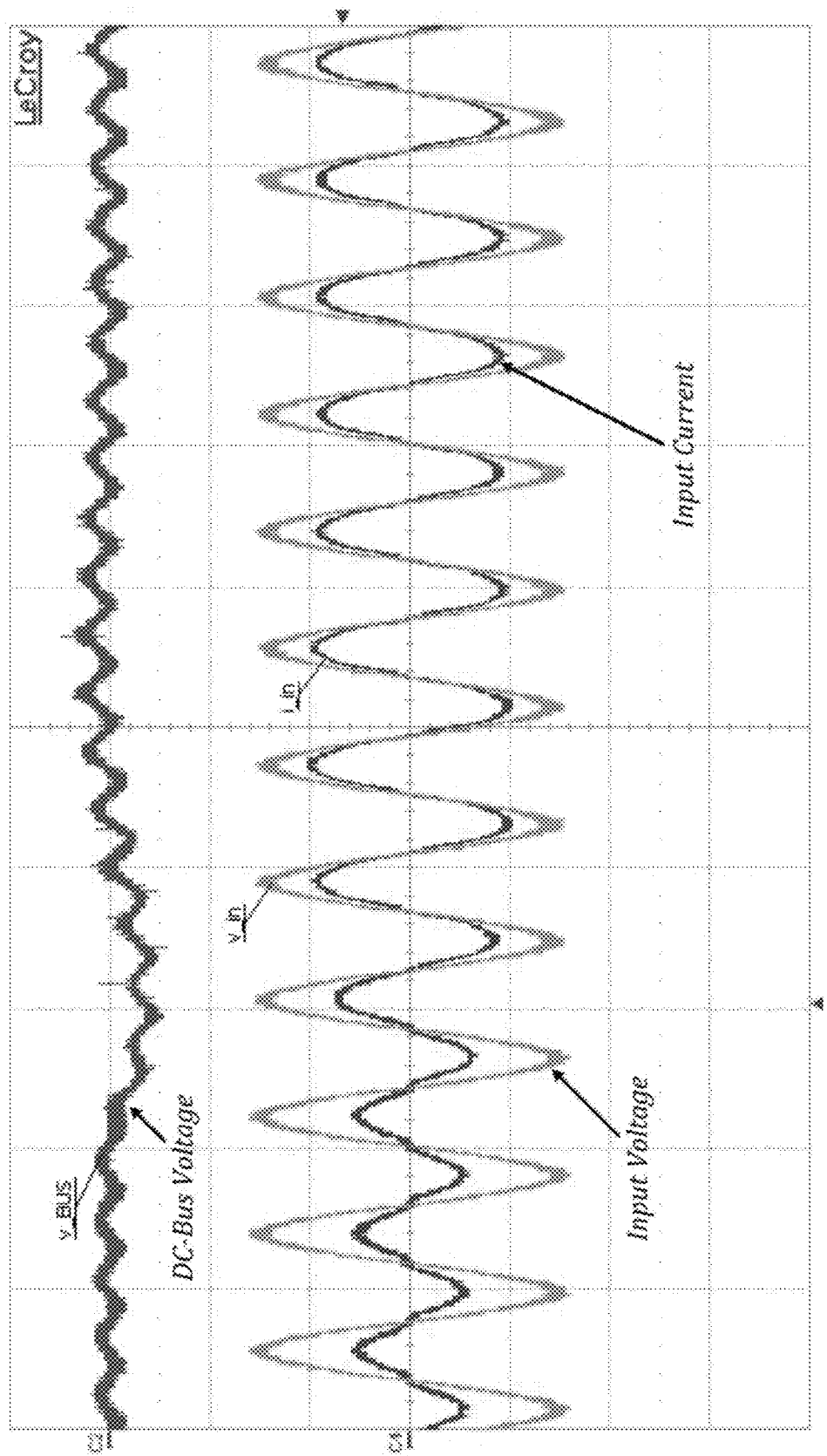
FIG. 32 is an enlarged version of FIG. 31.
Figure 33:
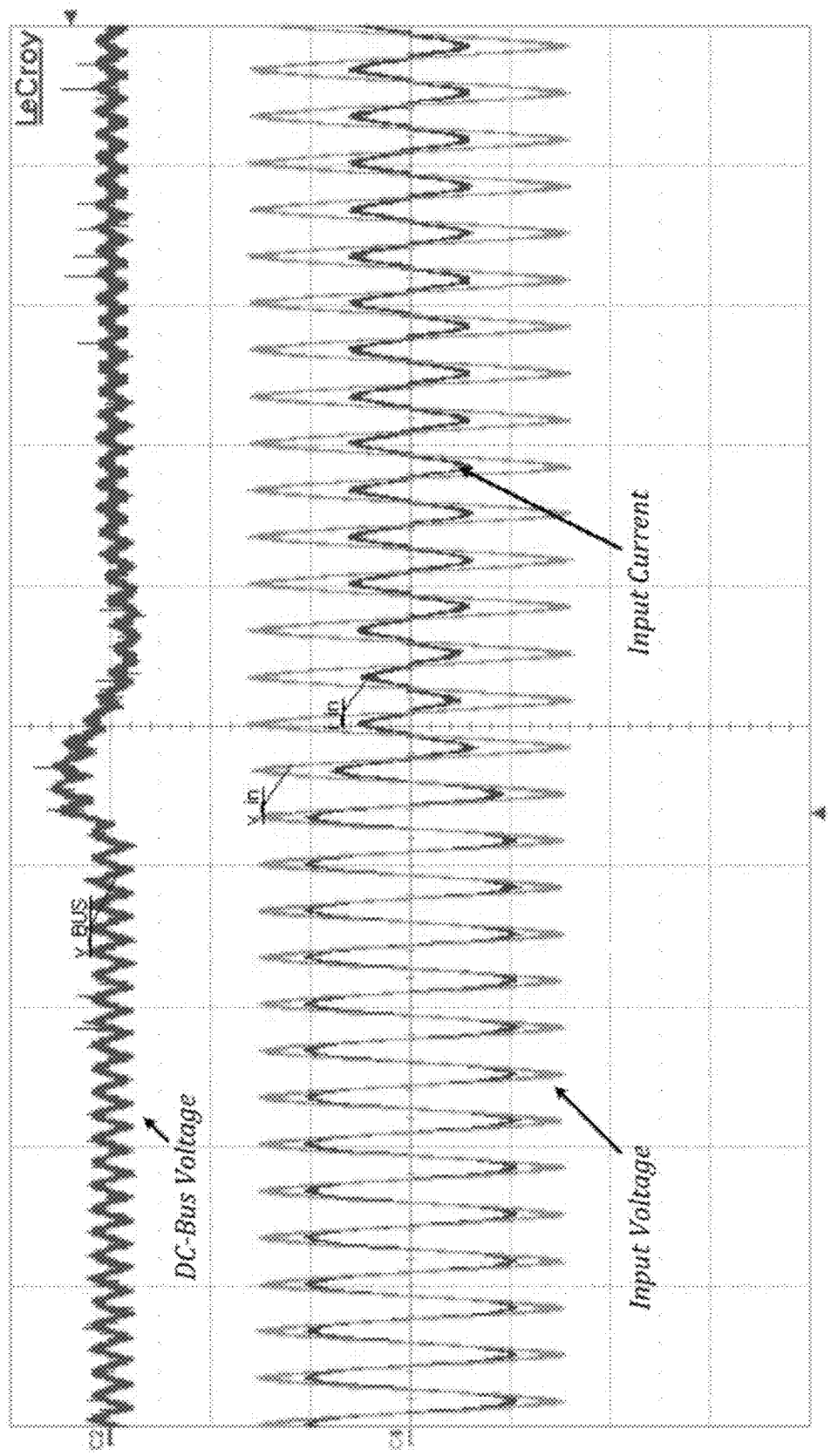
FIG. 33 shows the transient response of the converter when a 50% step load change is applied to the output of the converter.
Figure 34:
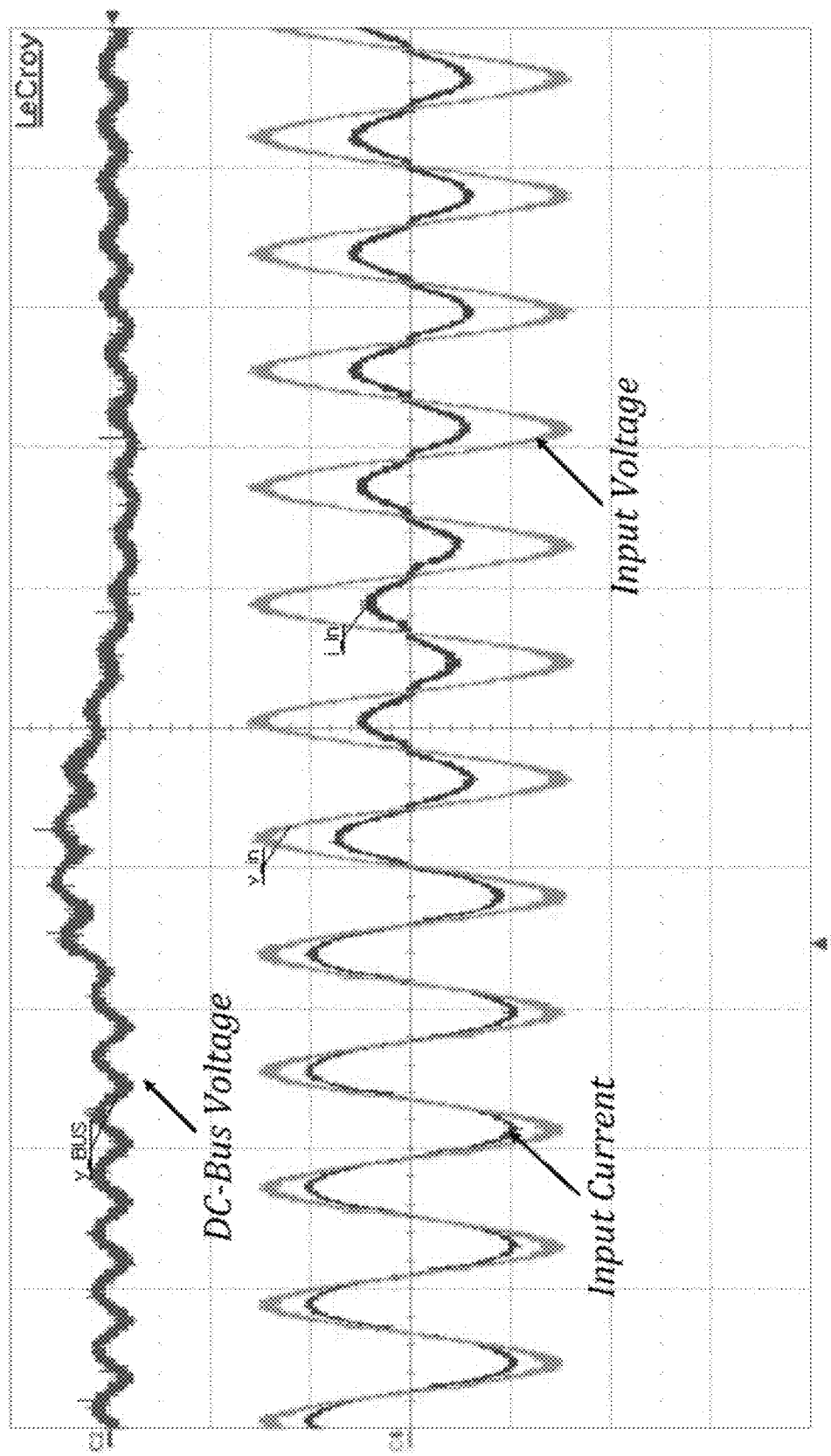
FIG. 34 is an enlarged version of FIG. 33.
Figure 35:
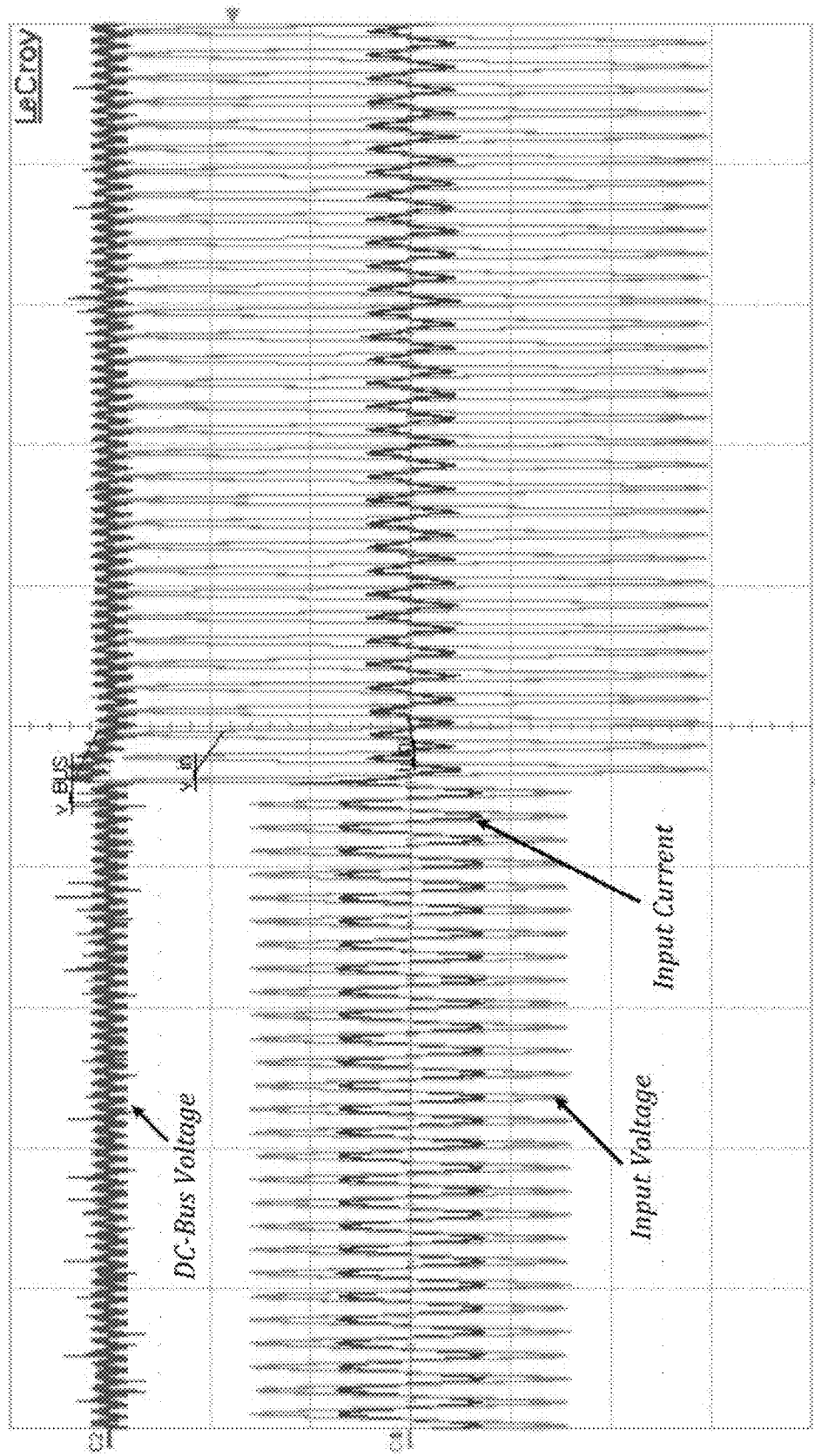
FIG. 35 shows the transient response of the converter when a 50% step change is applied to the line or input voltage.

In order to evaluate the transient performance of the sensorless control scheme, the dynamic response of the converter is obtained for step load changes. FIG. 31 shows the transient response of the closed-loop control system when a 50% positive step load change is applied to the converter. This figure shows that the observer is able to accurately estimate the inductor current and maintain the stability of the closed-loop system. FIG. 32 is the enlarged version of FIG. 31 to show in detail the transient performance during the step load change. FIG. 33 illustrates the transient response of the converter when a 50% step load change is applied to the output of the converter. This figure also confirms the stable performance of the closed-loop control system. FIG. 34 is the enlarged version of the FIG. 33 to illustrate the performance of the converter during the step load change. Finally, FIG. 35 shows the transient response of the converter when a step change is applied to the input voltage. According to this figure, the transient response for the line voltage is very fast and stable. This is because the observer immediately takes the instantaneous value of the input voltage and estimates the inductor current accordingly. It is worthwhile to mention that adaptiveness of the observer is very helpful since this enables the control system to quickly have information regarding the load/line conditions. Because of this, the control system performs very robustly and reliably in presence of any uncertainties in the converter. The load/line information can even be used to optimize the voltage and current controller in the cascaded closed-loop control system. Some of the features of the observer are summarized as follows:

Accurate and fast estimation of the inductor current,
Robust against parameter variations,
Estimates unknown load value $R_L$ due to the persistency of excitation,
Circumvents the singular points where the system loses observability.

The above describes an adaptive observer for a boost PFC converter. Due to the nonlinear structure of the converter, a linear observer cannot accurately estimate the inductor current. Another issue with the nonlinear structure of the converter is that the system loses observability at singular points which coincide with the zero crossings of the inductor current. The design of the observer is rendered more challenging because of this. An adaptive nonlinear observer is therefore used to accurately estimate the inductor current. To address the non-observability at the zero crossings of the inductor current, an auxiliary compensation block is used. The other challenge with the observer design is the unknown value of load $R_L$. The adaptive observer is able to precisely estimate the load value due to the persistency of excitation provided by the inherent low frequency ripple present at the output voltage. The performance of the adaptive observer has been analysed from a geometric point of view. This geometric analysis offers an intuitive insight in the closed-loop control performance. As well, comprehensive experimental results confirm the feasibility and practicality of the sensorless control system and demonstrate the superior performance compared to the conventional closed-loop control system.

It should be noted that the adaptive observer of the invention may also be implemented as a suitably programmed application specific integration circuit (ASIC) to provide the requisite control signals for the power semiconductors in the PFC converter.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A power factor correction boost converter with a current transformer, the converter comprising:
   a diode bridge coupled between a first coupling node and a second coupling node;
   an inductor coupled between said first coupling node and a third coupling node;
   a power semiconductor subcircuit coupled between said third coupling node and said second coupling node;
   an output diode coupled between said third coupling node and a positive output node;
   a control subsystem for controlling said first and second power semiconductor subcircuits, said control subsystem having as input an output voltage of said converter, and an input voltage of said converter, said output voltage being between said positive output node and said second coupling node, said input voltage being between said first coupling node and said second coupling node, said control system comprising:
   an adaptive observer subcircuit for estimating an inductor current and said output voltage;
   wherein said adaptive observer subcircuit comprises an auxiliary compensation block for resetting an integrator in said observer circuit when an input voltage waveform for said converter crosses zero with a negative slope.

2. A converter according to claim 1 wherein said adaptive observer subcircuit implements:

$$\dot{\hat{x}}_1 = \frac{1}{L}v_{in} - \frac{1}{L}u\hat{x}_2 + \left(\frac{1}{C_{BUS}} - \frac{1}{L}\right)(x_2 - \hat{x}_2)u$$

where
$\hat{x}_1$ is an updated estimate for an inductor current;
$x_2$ is the output voltage between said positive output node and said negative output node;
$\hat{x}_2$ is an estimate for said output voltage;
u is a value related to a duty ratio of said input;
L is an inductance of said converter; $C_{BUS}$ is an output capacitance of said converter; and
$v_{in}$ is the input voltage between said first coupling point and said second coupling point.

3. A converter according to claim 1 wherein said adaptive observer subcircuit implements:

$$\dot{\hat{x}}_2 = \frac{1}{C_{BUS}}u\hat{x}_1 - \hat{\theta}\hat{x}_2 + \vartheta(x_2 - \hat{x}_2)$$

where
$\hat{x}_2$ is an updated estimate for an output voltage between said positive output node and said negative output node;
$x_2$ is said output voltage;
$\hat{x}_2$ is an estimate for said output voltage;
$\hat{x}_1$ is an estimate for an inductor current;
$\theta$ is a positive real coefficient;
$\hat{\theta}$ is an estimated value based on $\hat{x}_2$ and $\theta$;
u is a value related to a duty ratio of said input; and
$C_{BUS}$ is an output capacitance of said converter.

4. A converter according to claim 1 wherein said control subsystem further comprises a subcircuit for estimating a value for $$\frac{1}{C_{BUS}R_L},$$

said estimate being based on:

$$\dot{\hat{\theta}} = -\mu\tilde{x}_2\hat{x}_2$$

where
$R_L$ is a load resistance;
$\dot{\hat{\theta}}$ is an updated estimate for a value for $$\frac{1}{C_{BUS}R_L};$$

$x_2$ is an output voltage between said positive output node and said negative output node;
$\tilde{x}_2$ is an estimated error for $x_2$;
$\hat{x}_2$ is an estimate for said output voltage;
$\mu$ is a positive constant value; and
$C_{BUS}$ is an output capacitance of said converter.

5. A converter according to claim 1 wherein said auxiliary compensation block extracts a low frequency ripple of said output voltage of said converter.

6. A converter according to claim 5 wherein said auxiliary compensation block comprises:
   a constant multiplier block receiving an input to said auxiliary compensation block, said input being said output voltage of said converter;
   a discrete differentiator block receiving an output of said multiplier block, said discrete differentiator being for;
   a comparator receiving an output of said differentiator block;
   a latch receiving an output of said comparator, said latch being triggered whenever said output voltage of said converter crosses zero with a negative slope.

7. An adaptive nonlinear observer circuit for estimating an inductor current and an output voltage of a power factor correction (PFC) boost converter, the observer circuit comprising:
   plurality of summing blocks;
   a plurality of multiplication blocks;
   a plurality of coefficient blocks;
   wherein said blocks implement:

$$\dot{\hat{x}}_1 = \frac{1}{L}v_{in} - \frac{1}{L}u\hat{x}_2 + \left(\frac{1}{C_{BUS}} - \frac{1}{L}\right)(x_2 - \hat{x}_2)u,$$

$$\dot{\hat{x}}_2 = \frac{1}{C_{BUS}}u\hat{x}_1 - \hat{\theta}\hat{x}_2 + \vartheta(x_2 - \hat{x}_2),$$

and $$\dot{\hat{\theta}} = -\mu\tilde{x}_2\hat{x}_2$$

where
$\dot{\hat{x}}_1$ is an updated estimate for an inductor current of said converter;
$\dot{\hat{x}}_2$ is an updated estimate for an output voltage between a positive output node and a negative output node of said converter;
$x_2$ is the output voltage of said converter;
$\hat{x}_2$ is an estimate for said output voltage;
$\hat{x}_1$ is an estimate for said inductor current of said converter;
u is a value related to a duty ratio of said input;
L is an inductance of said converter;
$C_{BUS}$ is an output capacitance of said converter; and
$v_{in}$ is the input voltage between said first coupling point and said second coupling point
$\tilde{x}_2$ is an estimated error of $x_2$;
$\hat{\theta}$ is an estimated value based on $\hat{x}_2$ and $\tilde{x}_2$;
$R_L$ is a load resistance;
$\dot{\hat{\theta}}$ is an updated estimate for a value for $$\frac{1}{C_{BUS}R_L};$$

$\upsilon$ is a positive real coefficient; and
$\mu$ is a positive constant value.

8. An adaptive observer circuit wherein $\dot{\hat{\theta}} = -\mu\tilde{x}_2\hat{x}_2$ is implemented as a subcircuit of said adaptive observer circuit.

9. An adaptive nonlinear observer circuit according to claim 7 wherein said observer circuit further comprises an auxiliary compensation block for resetting an integrator in said observer circuit when an input voltage waveform for said converter crosses zero with a negative slope.

10. An adaptive nonlinear observer circuit according to claim 9 wherein said auxiliary compensation block extracts a low frequency ripple of said output voltage of said converter.

11. An observer circuit according to claim 10 wherein said auxiliary compensation block comprises:
   a constant multiplier block receiving an input to said auxiliary compensation block, said input being said output voltage of said converter;
   a discrete differentiator block receiving an output of said multiplier block, said discrete differentiator being for;
   a comparator receiving an output of said differentiator block;
   a latch receiving an output of said comparator, said latch being triggered whenever said output voltage of said converter crosses zero with a negative slope.

12. A method for estimating an inductor current and an output voltage for a power factor correction boost converter, the method comprising:
   a) determining an input voltage for said converter;
   b) determining an output voltage for said converter;
   c) determining an output capacitance for said converter;
   d) determining an inductance for said converter;
   e) continuously estimating said output voltage based on a previous reading of said output voltage;
   f) continuously estimating said inductor current based on estimates of said output voltage;

wherein steps e) and f) are executed using:

$$\dot{\hat{x}}_1 = \frac{1}{L}v_{in} - \frac{1}{L}u\hat{x}_2 + \left(\frac{1}{C_{BUS}} - \frac{1}{L}\right)(x_2 - \hat{x}_2)u;$$

$$\dot{\hat{x}}_2 = \frac{1}{C_{BUS}}u\hat{x}_1 - \hat{\theta}\hat{x}_2 + \vartheta(x_2 - \hat{x}_2);$$

and $$\dot{\hat{\theta}} = -\mu\tilde{x}_2\hat{x}_2$$

where
$\dot{\hat{x}}_1$ is an updated estimate for said inductor current of said converter;
$\dot{\hat{x}}_2$ is an updated estimate for said PFC output voltage, said output voltage being between a positive output node and a negative output node of said converter;
$x_2$ is said output voltage;
$\hat{x}_2$ is an estimate for said PFC output voltage;
$\hat{x}_1$ is an estimate for said inductor current of said converter;
u is a value related to a duty ratio of said input;
L is an inductance of said converter;
$C_{BUS}$ is an output capacitance of said converter;
$v_{in}$ is the input voltage between said first coupling point and said second coupling point;
$\tilde{x}_2$ is an estimated error of $x_2$;
$\hat{\theta}$ is an estimated value based on $\hat{x}_2$ and $\tilde{x}_2$
$R_L$ is a load resistance;
$\dot{\hat{\theta}}$ is an updated estimate for a value for $$\frac{1}{C_{BUS}R_L};$$

υ is a positive real coefficient; and
μ is a positive constant value.

13. A method according to claim 12 further comprising resetting an integrator in an observer circuit in a control system controlling said converter, said integrator being reset when an input voltage waveform for said converter crosses zero with a negative slope.

14. A method according to claim 13 further comprising extracting a low frequency ripple of said output voltage of said converter to determine when to reset said integrator.

15. A power factor correction boost converter with a current transformer, the converter comprising:
a diode bridge coupled between a first coupling node and a second coupling node;
a first inductor coupled between said first coupling node and a third coupling node;
a first power semiconductor subcircuit coupled between said third coupling node and said second coupling node;
a first output diode coupled between said third coupling node and a positive output node;
a second inductor coupled between said first coupling node and a fourth coupling node;
a second output diode coupled between said fourth coupling node and said positive output node;
a second power semiconductor subcircuit coupled between said second coupling node and said fourth coupling node;
a control subsystem for controlling said first and second power semiconductor subcircuits, said control subsystem having as input an output voltage of said converter, and an input voltage of said converter, said output voltage being between said positive output node and said second coupling node, said input voltage being between said first coupling node and said second coupling node, said control system comprising:
an adaptive observer subcircuit for estimating an inductor current and said output voltage.

16. A power factor correction boost converter according to claim 15 wherein said adaptive observer circuit implements:

$$\dot{\hat{x}}_1 = \frac{1}{L}v_{in} - \frac{1}{L}u\hat{x}_2 + \left(\frac{1}{C_{BUS}} - \frac{1}{L}\right)(x_2 - \hat{x}_2)u,$$

$$\dot{\hat{x}}_2 = \frac{1}{C_{BUS}}u\hat{x}_1 - \hat{\theta}\hat{x}_2 + \vartheta(x_2 - \hat{x}_2),$$

and $$\dot{\hat{\theta}} = -\mu\tilde{x}_2\hat{x}_2$$

where
$\dot{\hat{x}}_1$ is an updated estimate for an inductor current of said converter;
$\dot{\hat{x}}_2$ is an updated estimate for an output voltage between a positive output node and a negative output node of said converter;
$x_2$ is the output voltage of said converter;
$\hat{x}_2$ is an estimate for said output voltage;
$\hat{x}_1$ is an estimate for said inductor current of said converter;
u is a value related to a duty ratio of said input;
L is an inductance of said converter;
$C_{BUS}$ is an output capacitance of said converter; and
$v_{in}$ is the input voltage between said first coupling point and said second coupling point
$\tilde{x}_2$ is an estimated error of $x_2$;
$\hat{\theta}$ is an estimated value based on $\hat{x}_2$ and $\tilde{x}_2$;
$R_L$ is a load resistance;
$\dot{\hat{\theta}}$ is an updated estimate for a value for $$\frac{1}{C_{BUS}R_L};$$

υ is a positive real coefficient; and
μ is a positive constant value.

17. A power factor correction boost converter according to claim 15 wherein said adaptive observer circuit further comprises an auxiliary compensation block for resetting an integrator in said observer circuit when an input voltage waveform for said converter crosses zero with a negative slope.

18. A power factor correction boost converter according to claim 17 wherein said auxiliary compensation block comprises:
a constant multiplier block receiving an input to said auxiliary compensation block, said input being said output voltage of said converter;
a discrete differentiator block receiving an output of said multiplier block, said discrete differentiator being for;
a comparator receiving an output of said differentiator block;
a latch receiving an output of said comparator, said latch being triggered whenever said output voltage of said converter crosses zero with a negative slope.

19. A power factor correction boost converter according to claim 17 wherein said adaptive observer circuit wherein said auxiliary compensation block extracts a low frequency ripple of said output voltage of said converter.

* * * * *